United States Patent
Hirota et al.

(10) Patent No.: US 7,994,917 B2
(45) Date of Patent: Aug. 9, 2011

(54) APPARATUS FOR FIXING RFID TAGS

(75) Inventors: Mitsuo Hirota, Toyoake (JP); Koshiro Yamaguchi, Kakamigahara (JP); Tsuyoshi Nagae, Kasugai (JP); Akira Ito, Ashiya (JP); Tsuyoshi Ohashi, Hashima (JP); Shiro Yamada, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 558 days.

(21) Appl. No.: 11/866,581

(22) Filed: Oct. 3, 2007

(65) Prior Publication Data
US 2008/0079585 A1    Apr. 3, 2008

(30) Foreign Application Priority Data
Oct. 3, 2006    (JP) .................................. 2006-271786

(51) Int. Cl.
G08B 13/14    (2006.01)
(52) U.S. Cl. ..................................... 340/572.1; 235/375
(58) Field of Classification Search .... 340/572.1–572.9; 235/375–385
See application file for complete search history.

(56) References Cited

U.S. PATENT DOCUMENTS

| | | | | |
|---|---|---|---|---|
| 7,064,668 B2 * | 6/2006 | Porad | ........................ | 340/572.1 |
| 7,073,712 B2 * | 7/2006 | Jusas et al. | ..................... | 235/451 |
| 7,245,227 B2 * | 7/2007 | Winter et al. | ............... | 340/686.2 |
| 7,389,920 B2 * | 6/2008 | Rodgers | ......................... | 235/385 |
| 7,602,288 B2 * | 10/2009 | Broussard | .................. | 340/572.1 |
| 7,609,406 B2 * | 10/2009 | Roth et al. | ..................... | 358/1.15 |
| 2004/0094630 A1 * | 5/2004 | Tani | ............................. | 235/487 |

FOREIGN PATENT DOCUMENTS

| | | |
|---|---|---|
| JP | 2002-053116 A | 2/2002 |
| JP | 2004-155150 A | 6/2004 |
| JP | 2004-202894 A | 7/2004 |
| JP | 2006-001616 A | 1/2006 |
| JP | 2006-031456 A | 2/2006 |

* cited by examiner

*Primary Examiner* — George A Bugg
*Assistant Examiner* — Edny Labbees
(74) *Attorney, Agent, or Firm* — Baker Botts L.L.P.

(57) ABSTRACT

An apparatus for fixing RFID tags fixes a RFID circuit element on a print label to produce a RFID label. At this time, a barcode provided on the print label side is read by a barcode sensor, and information to be written corresponding to barcode information is written into the RFID circuit element through an antenna via wireless communication. The barcode on the print label is associated with the label print, whereby a RFID label with print can be produced in which the label print and the information to be stored in the RFID circuit element are associated with each other.

4 Claims, 17 Drawing Sheets

[FIG. 1]
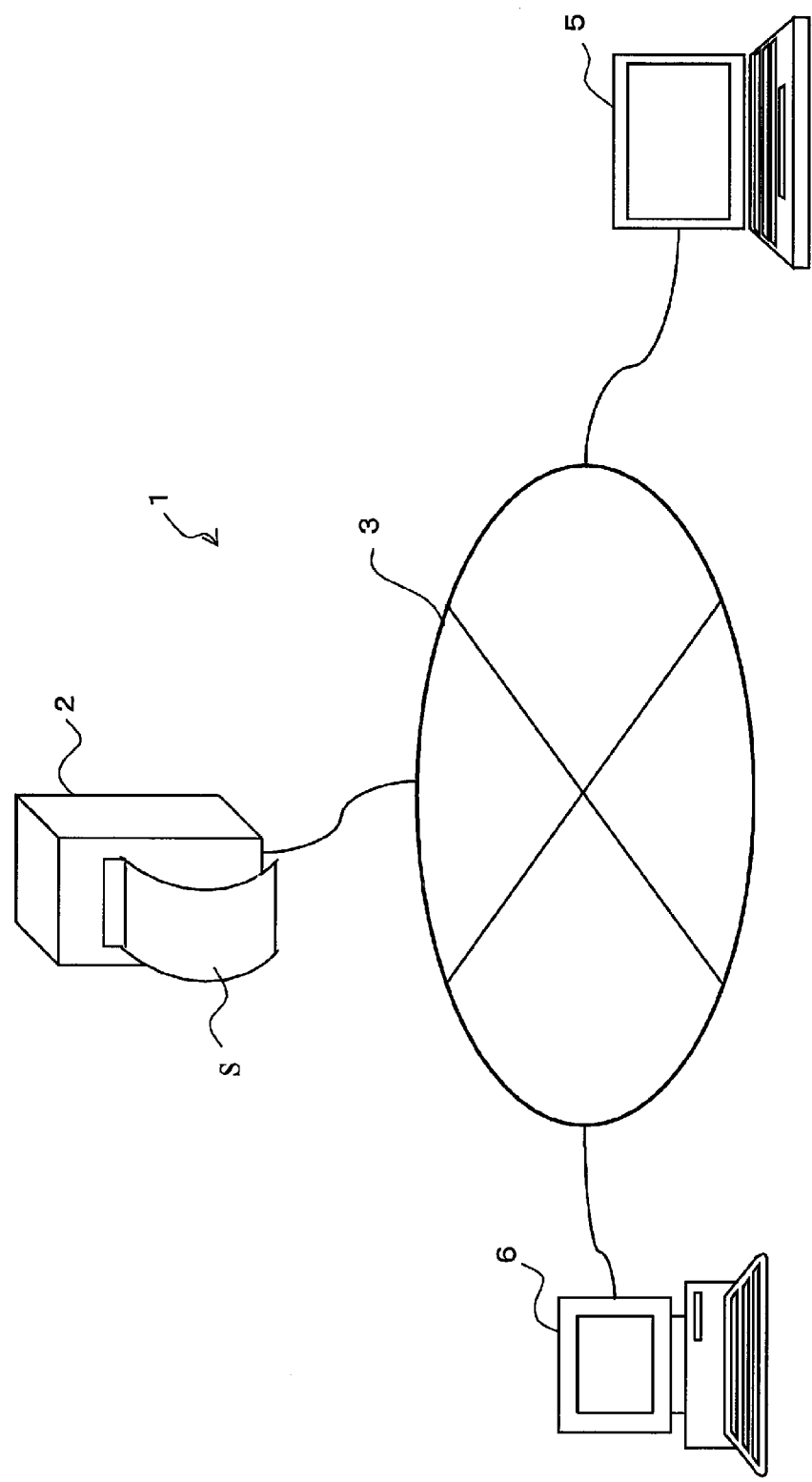

[FIG.2]
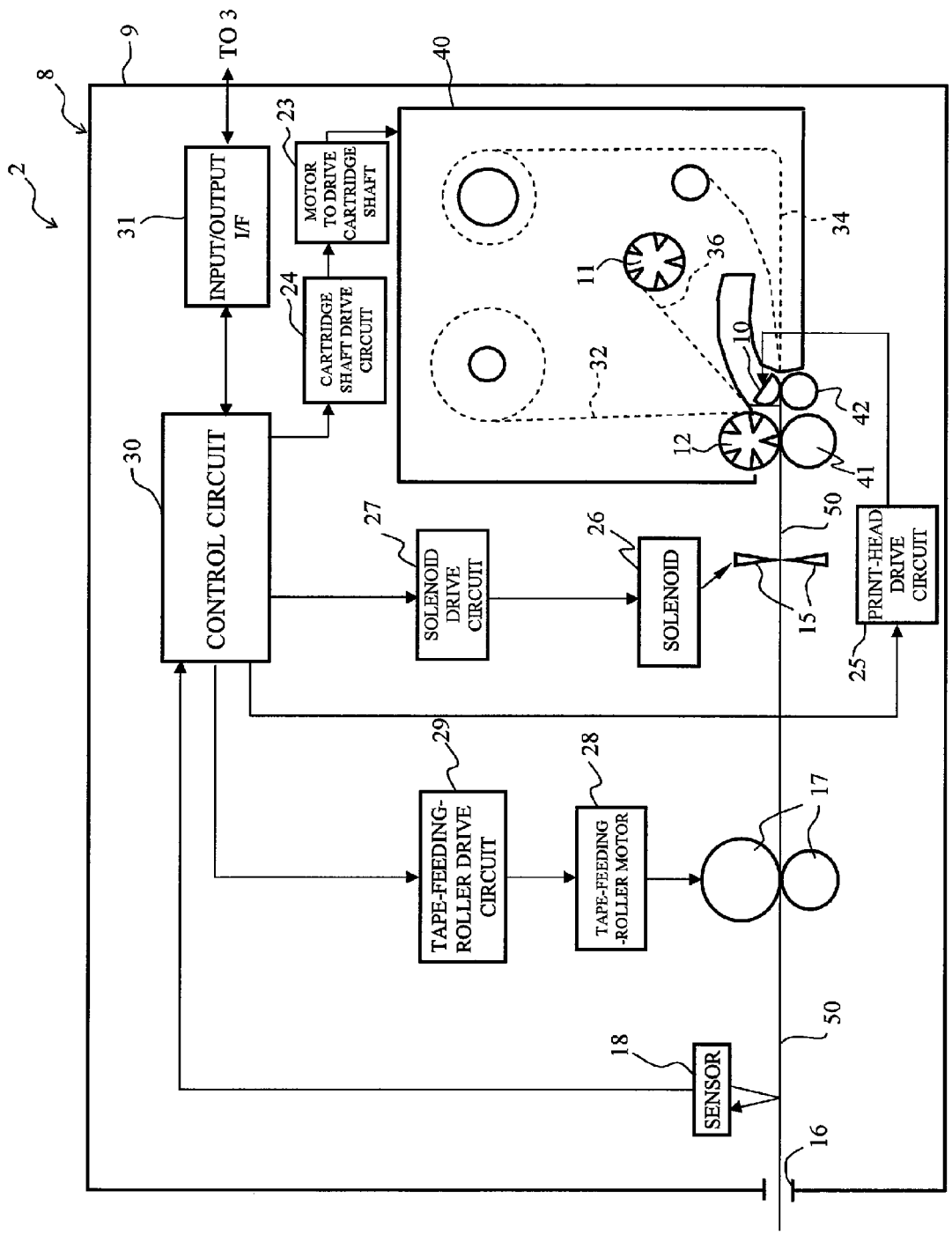

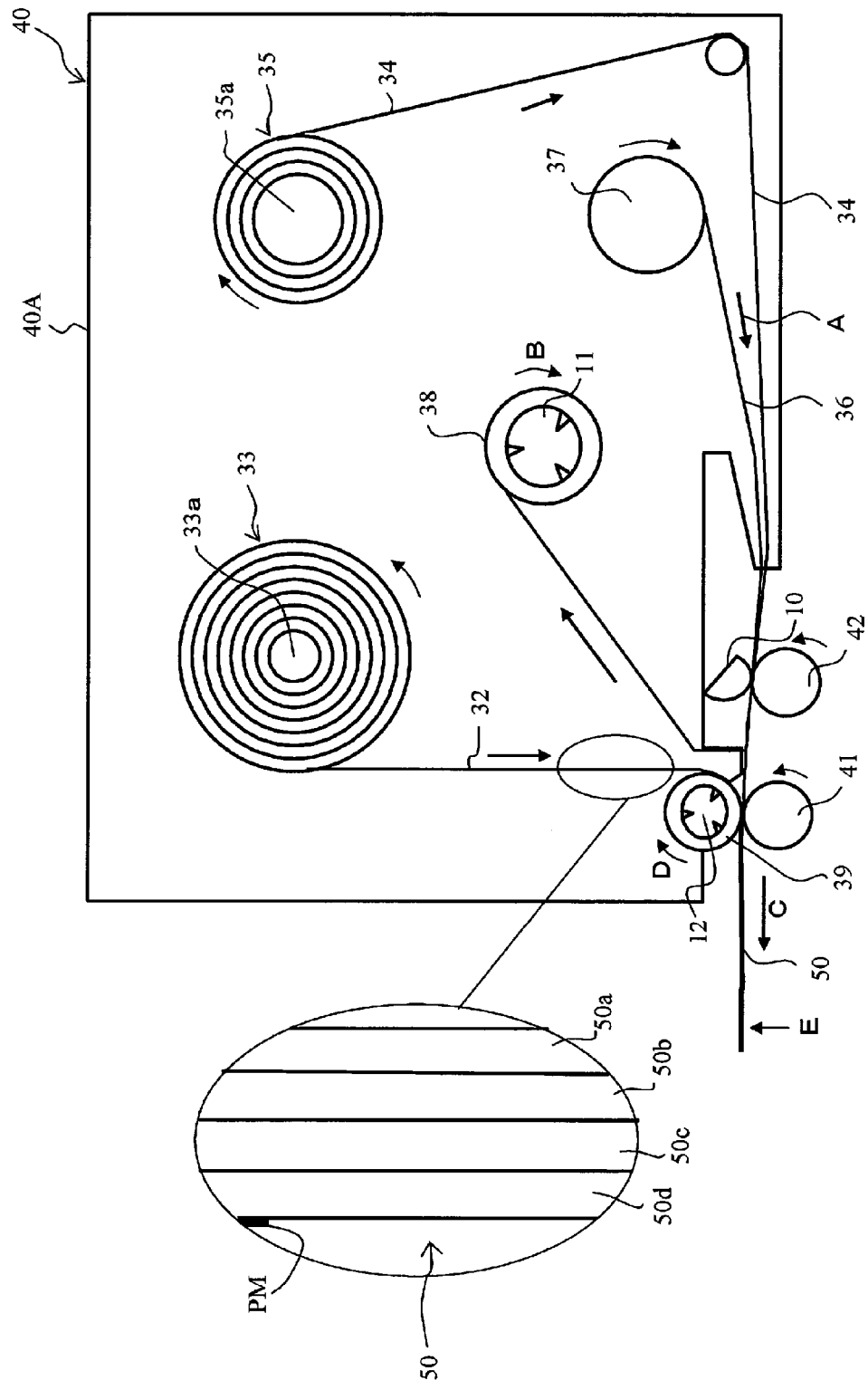
[FIG.3]

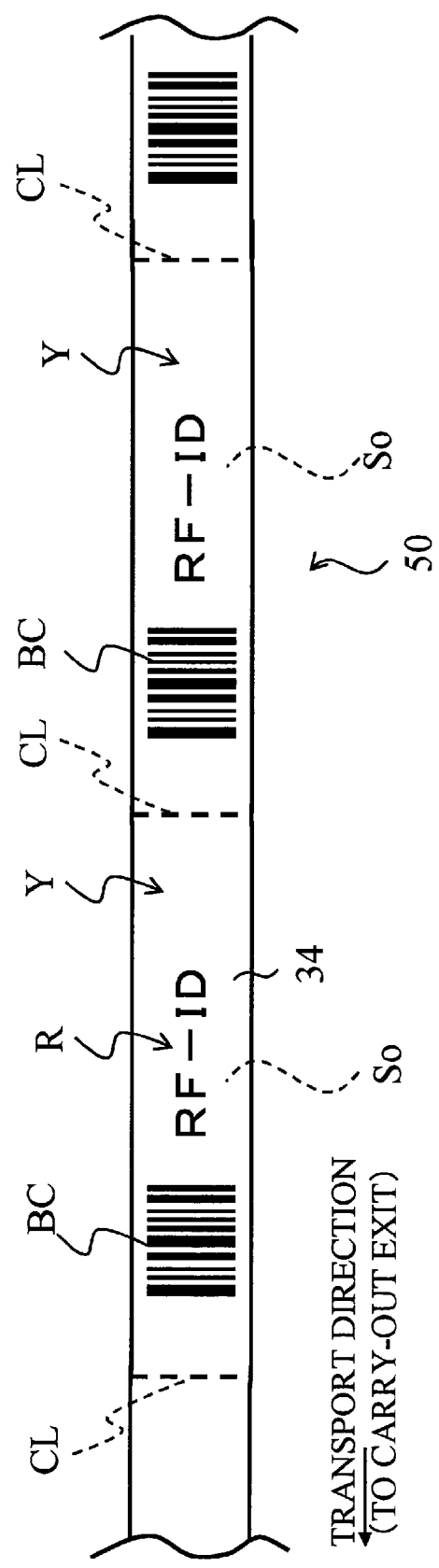
[FIG.4]

[FIG.5]
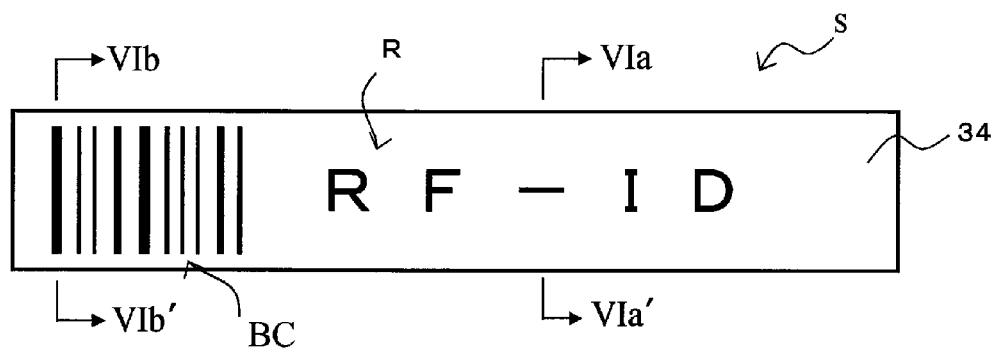
[FIG.6A]
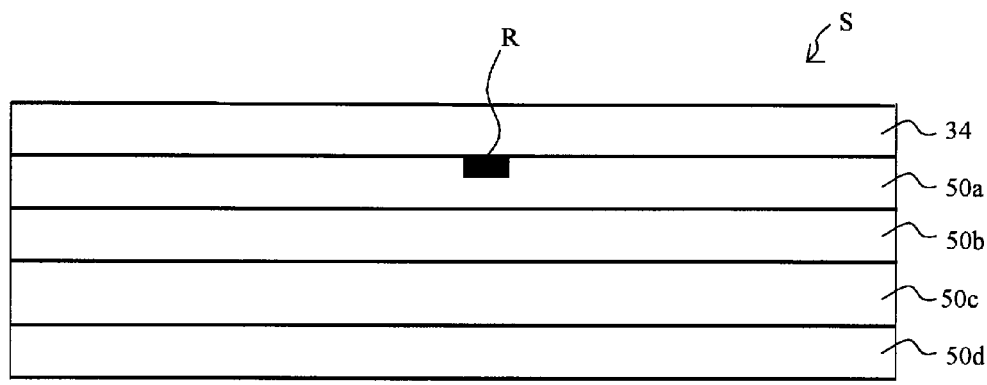
[FIG.6B]
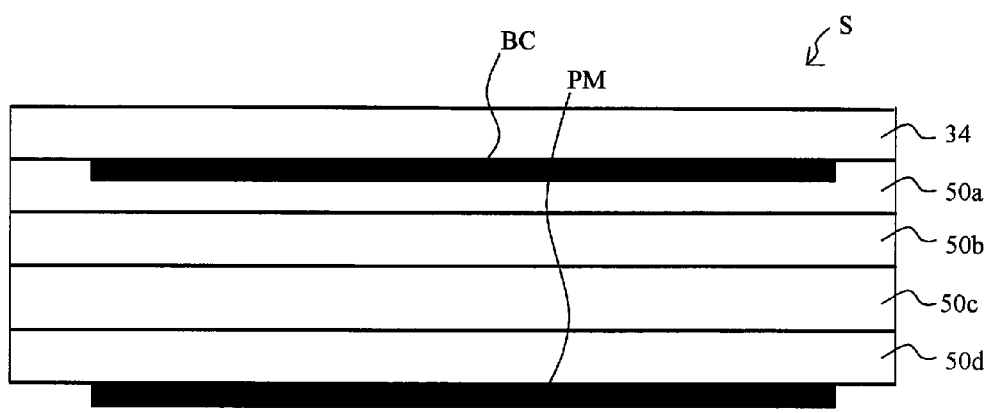

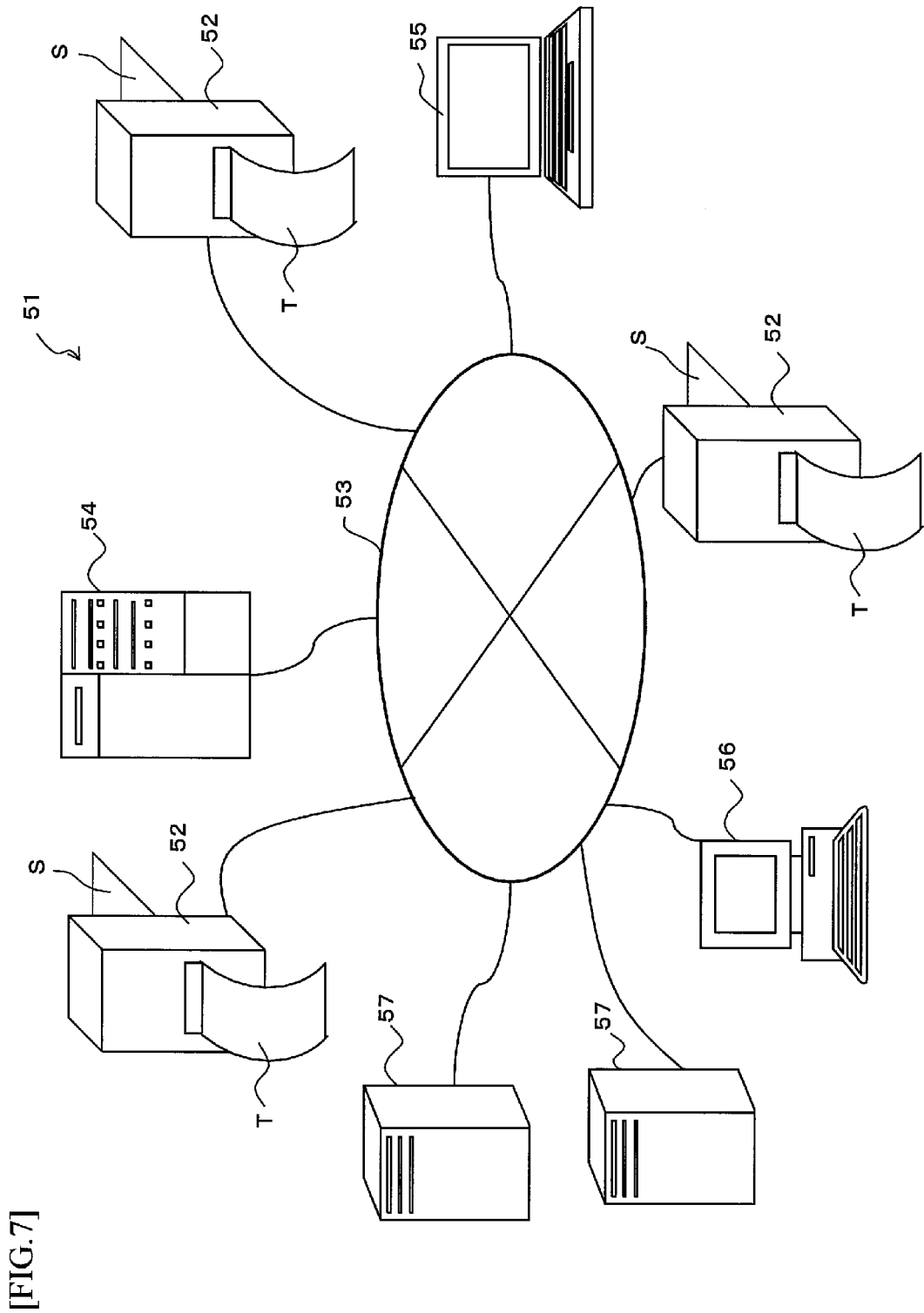
[FIG.7]

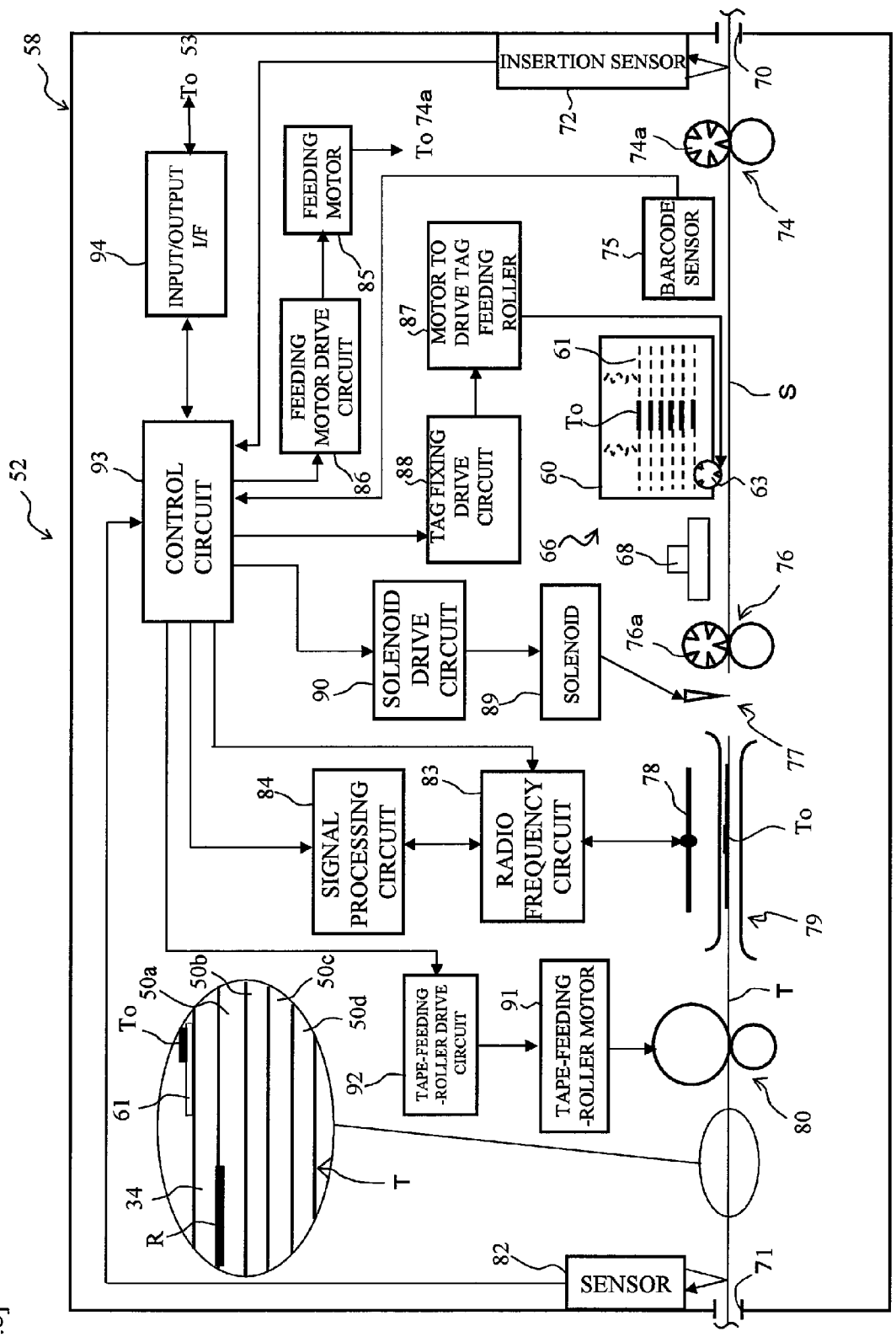
[FIG.8]

[FIG.9]
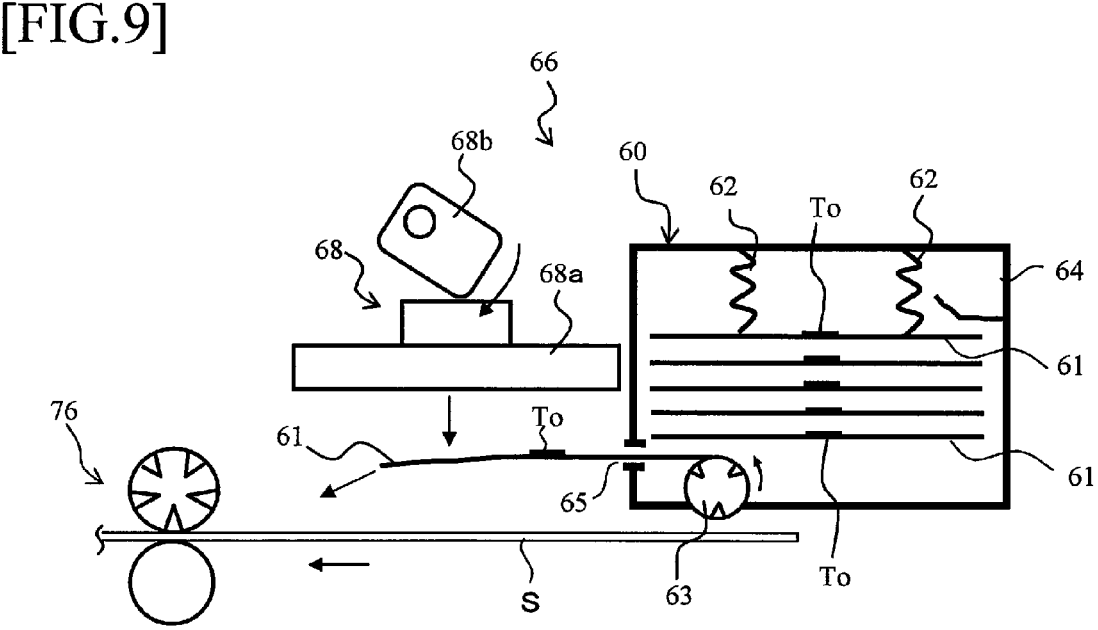

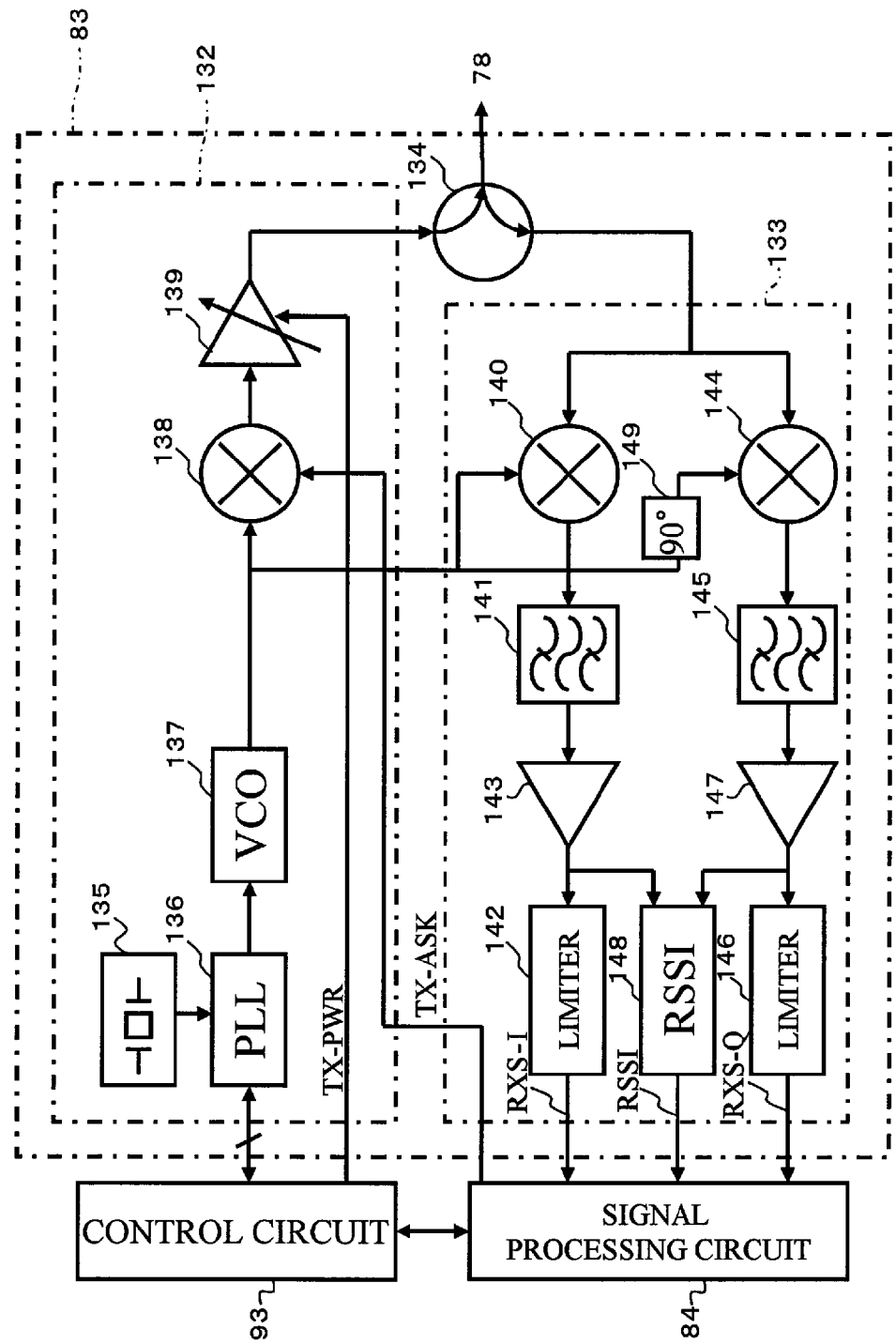
[FIG.10]

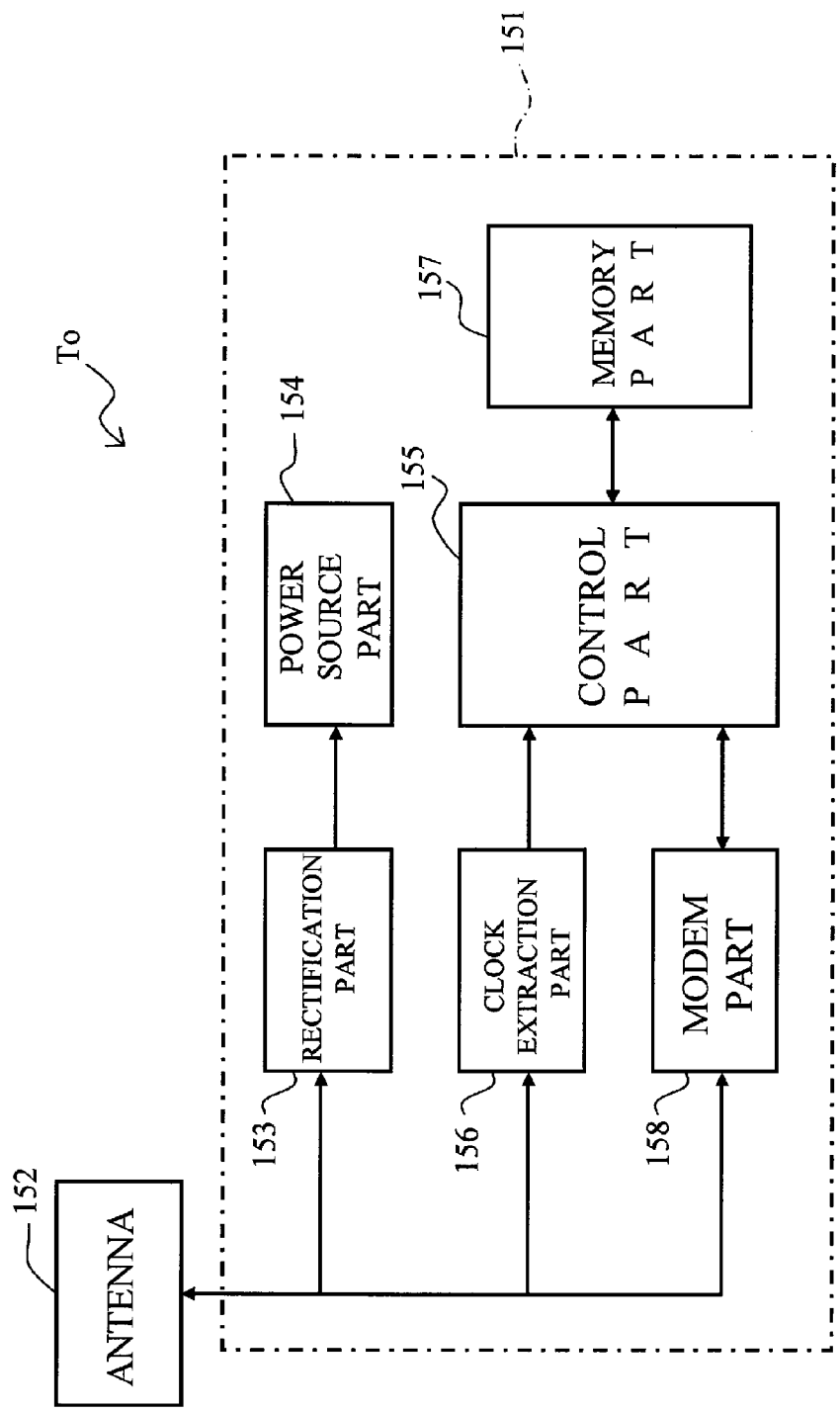
[FIG.11]

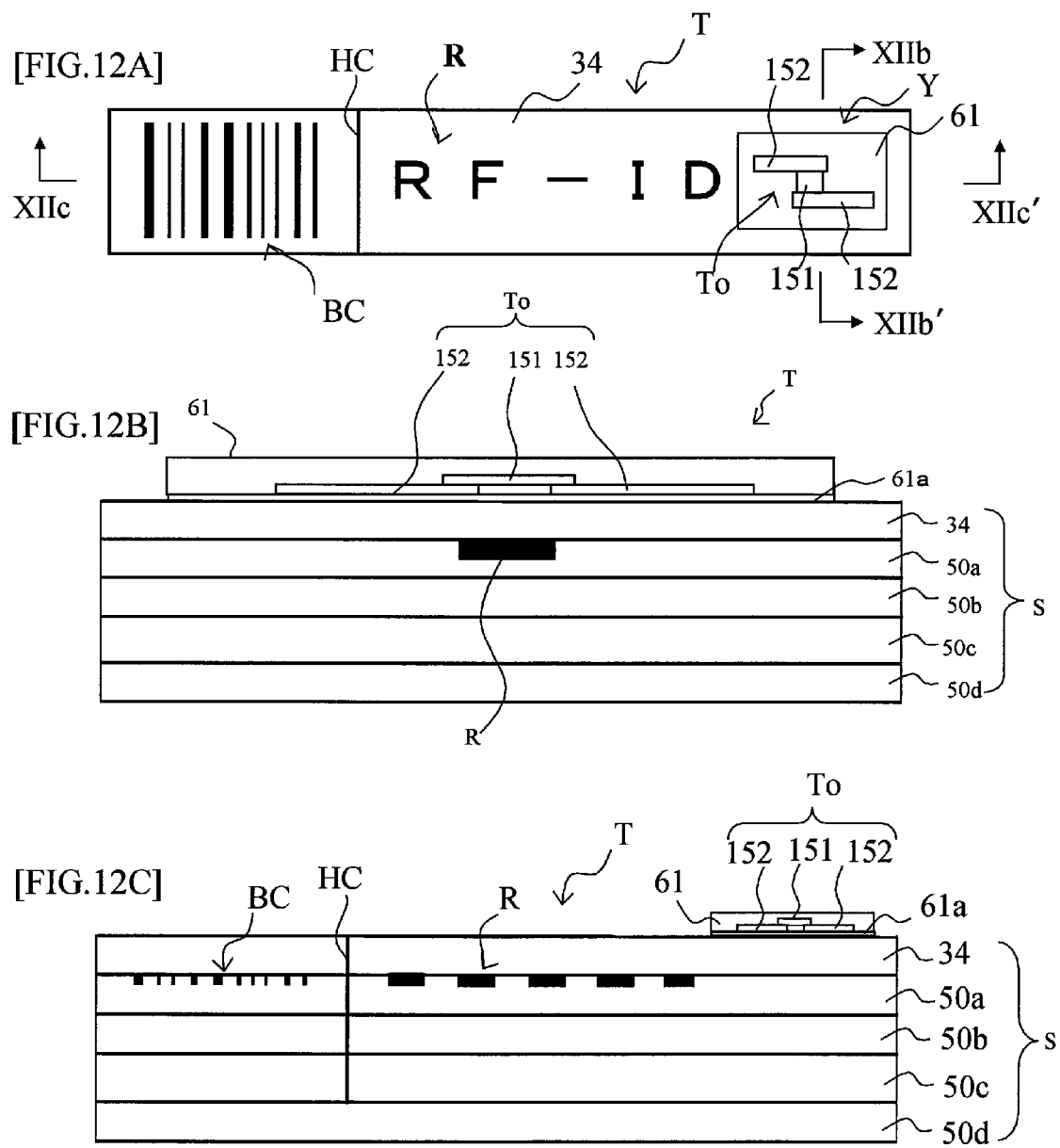

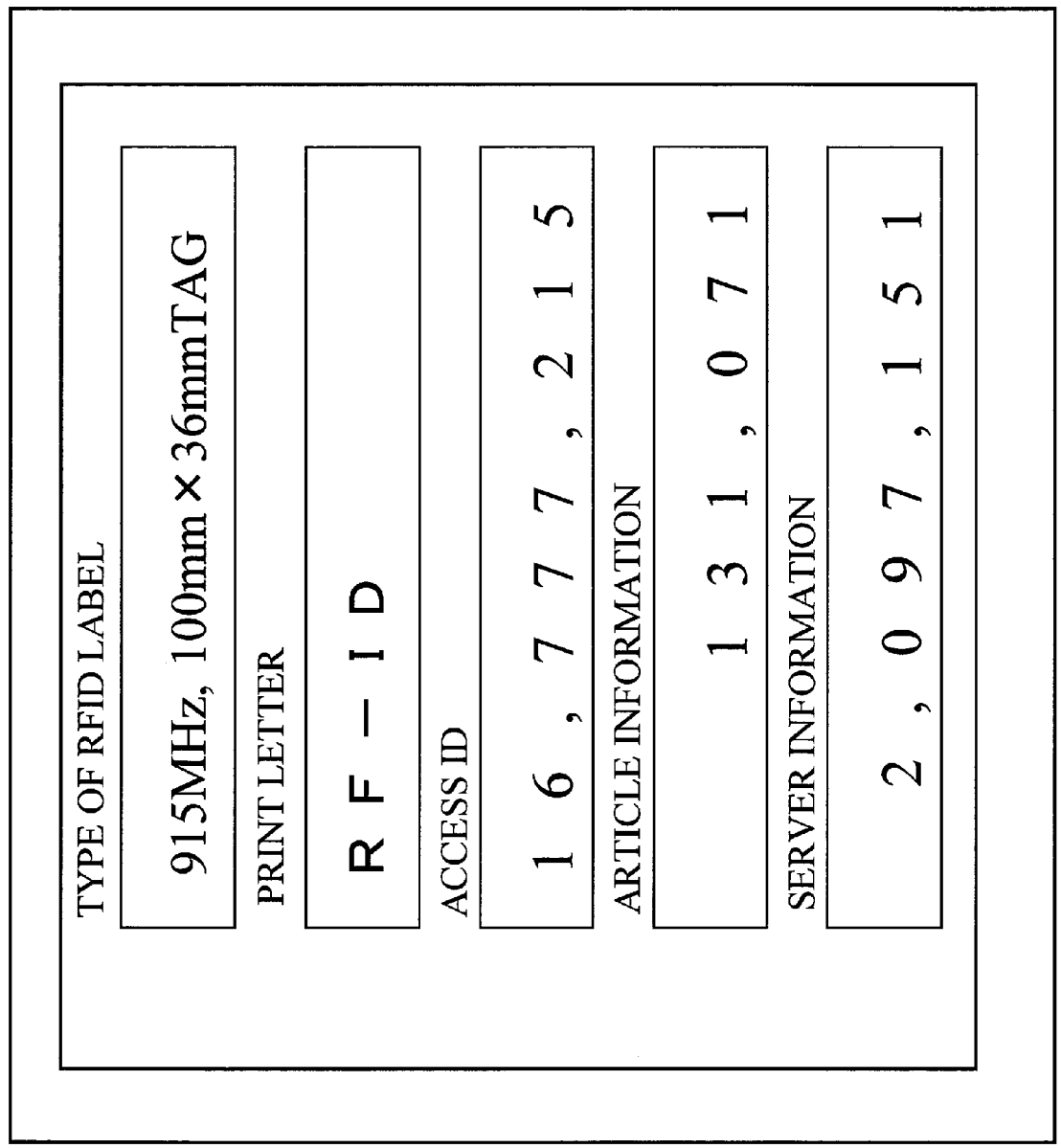
[FIG.13]

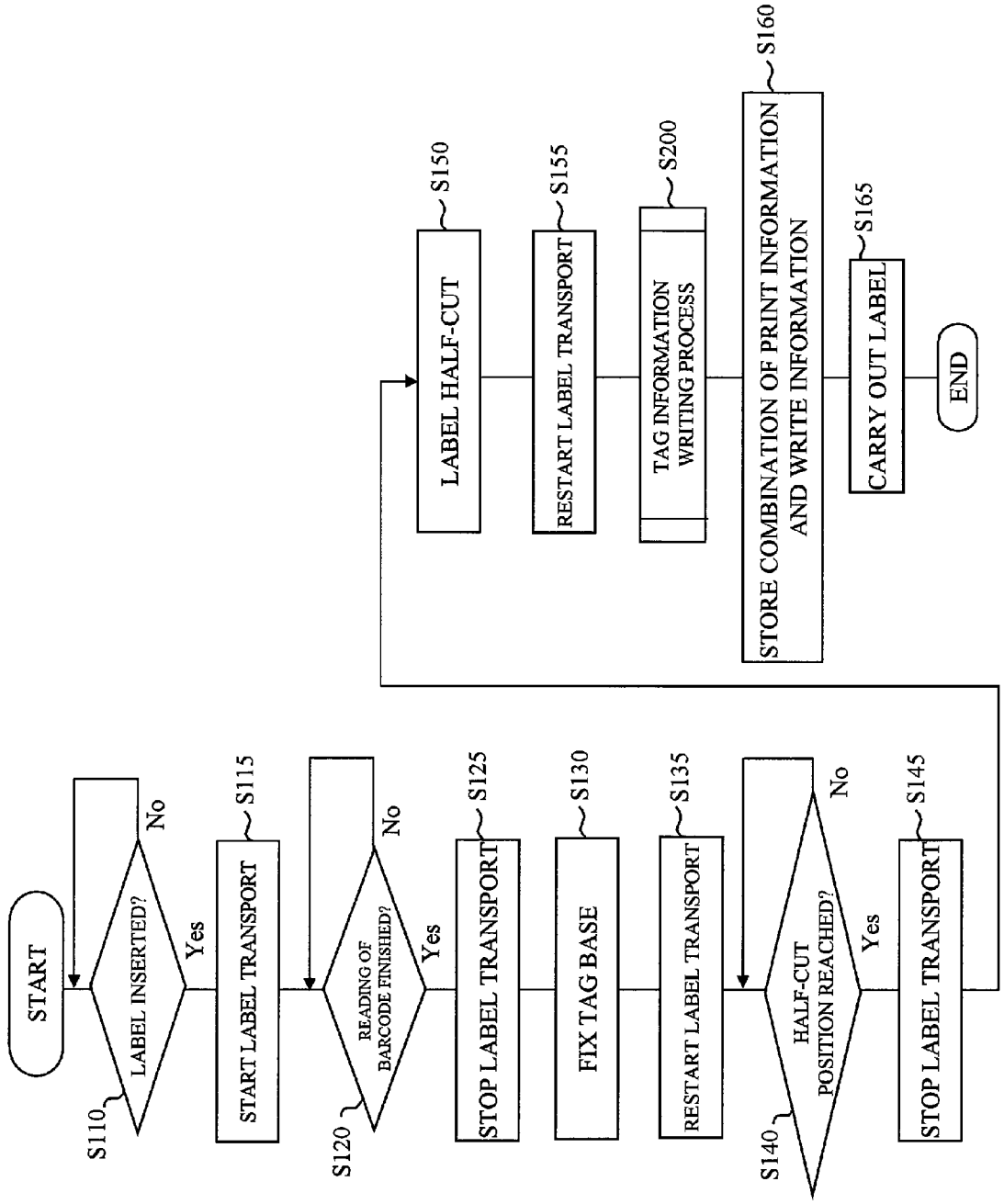
[FIG.14]

[FIG.15]
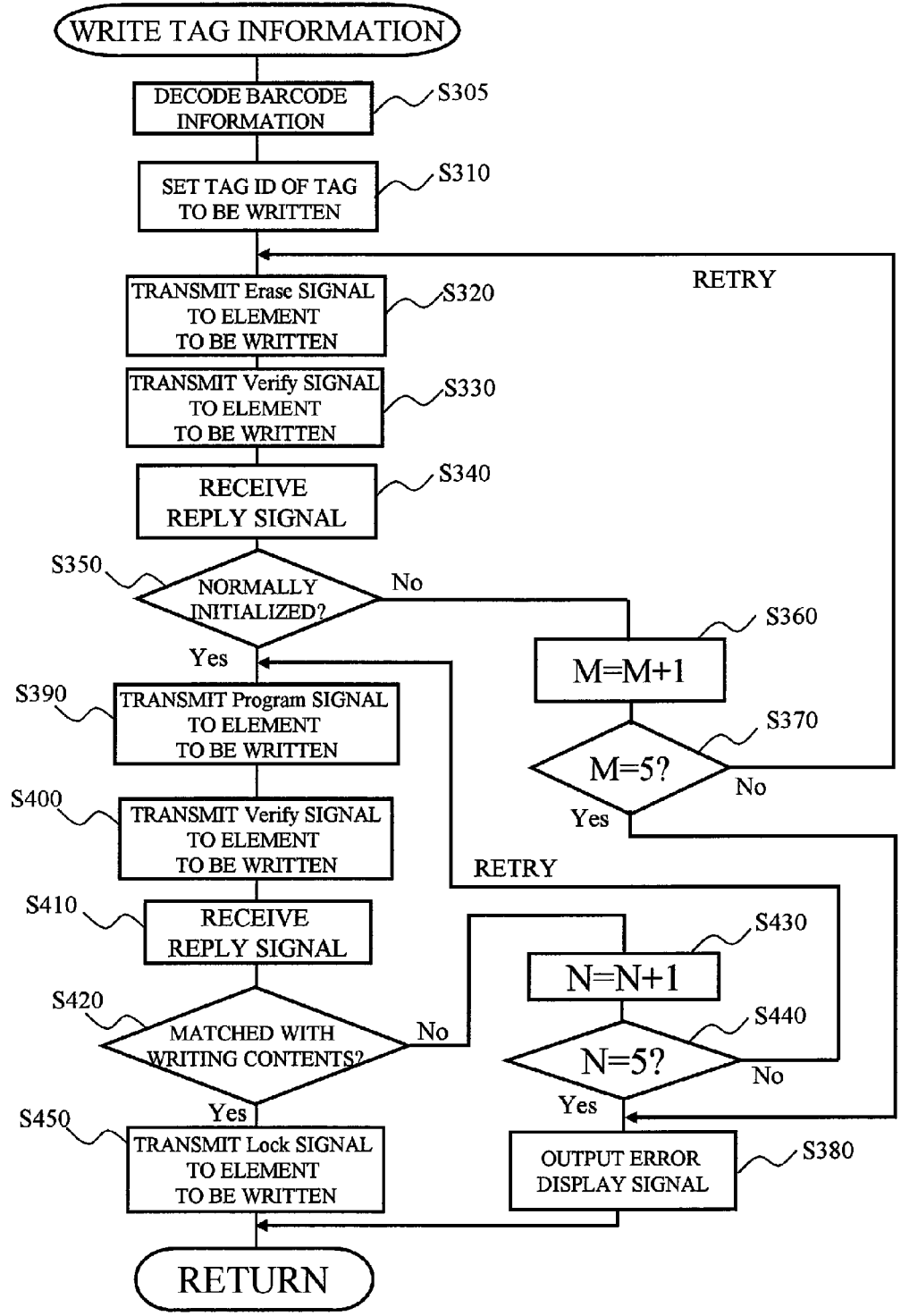

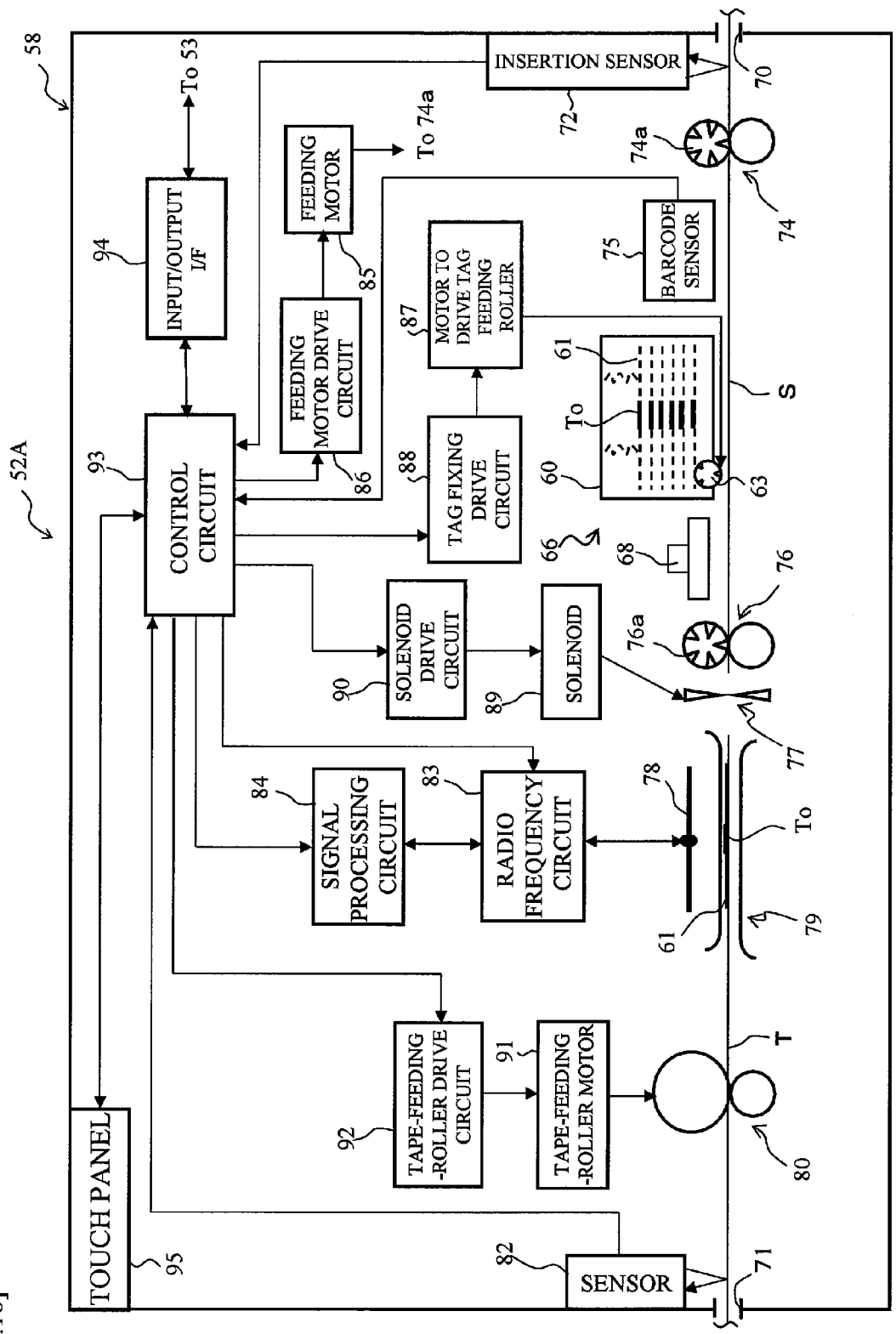
[FIG.16]

[FIG.17]
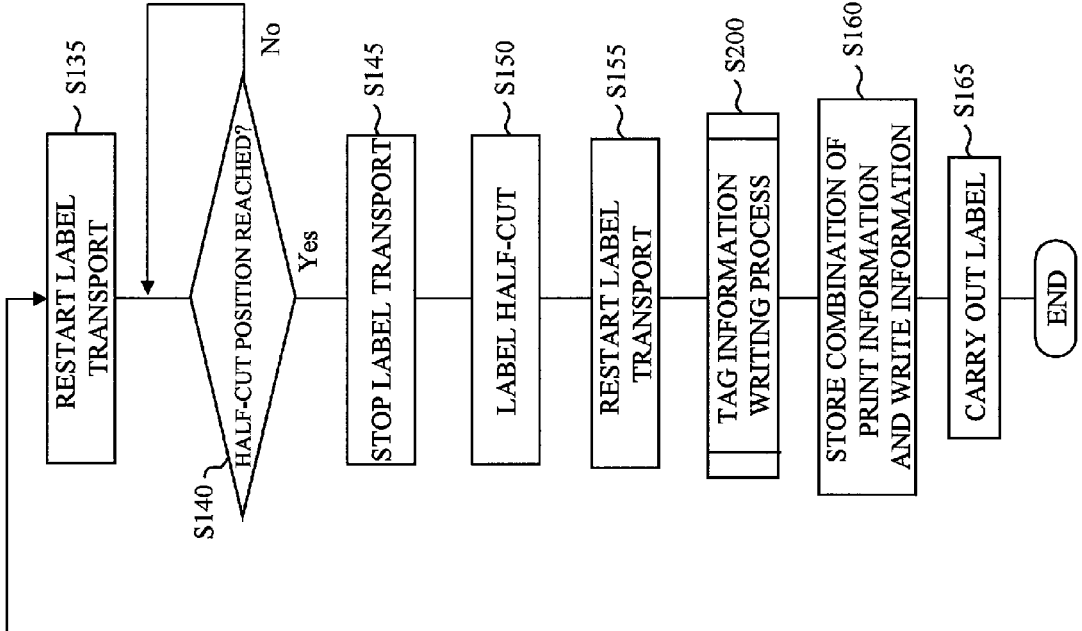
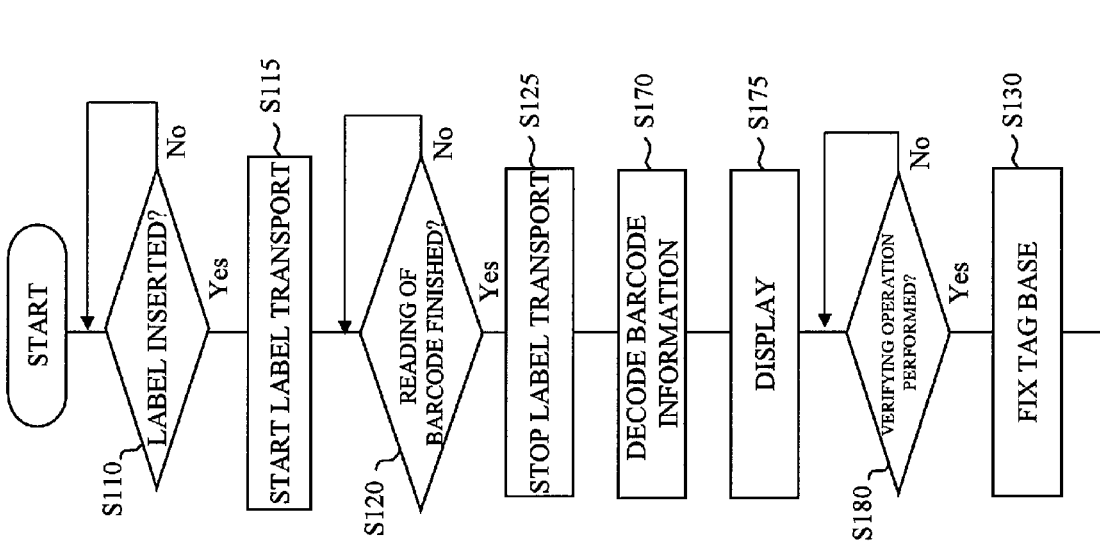

[FIG.18]
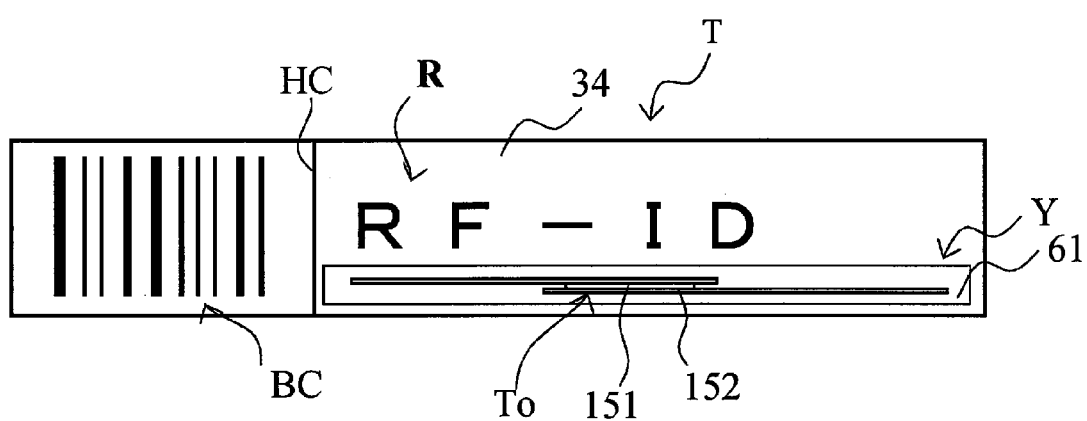

APPARATUS FOR FIXING RFID TAGS

CROSS-REFERENCE TO RELATED APPLICATIONS

This application claims priority from JP 2006-271786, filed Oct. 3, 2006, the contents of which are hereby incorporated by reference.

BACKGROUND OF THE INVENTION

1. Field of the Invention

The present invention relates to an apparatus for fixing RFID tags configured to produce RFID labels using print labels.

2. Description of the Related Art

Conventionally, there has already been proposed a tape printing apparatus (label producing apparatus) (see, for example, JP, A, 2004-155150) which loads a tape to be a print-receiving member into a cartridge (tape cassette) in a roll state, and produces print labels by printing desired characters while feeding out the tape from the roll.

An arrangement proposed with this prior art includes a roll formed by winding a base tape having a separation sheet (two-sided adhesive tape) and a roll formed by winding a print-receiving tape (film tape) to be bonded on the base tape to carry out a predetermined print on the print-receiving tape while feeding out the base tape and the print-receiving tape from the two rolls, respectively, bond the print-receiving tape with print and the base tape to create a label tape with print, and cut the label tape with print into a predetermined length by a cutter, thus producing a print label.

Recently, RFID (Radio Frequency Identification) systems have been drawing attention which performs reading/writing of information contactlessly between a small RFID tag provided with a RFID circuit element including an IC circuit part capable of storing information and an antenna, and a reader/writer (reading/writing apparatus). The RFID circuit element provided on the tag is accessible (for reading/writing of information) from the reader/writer even if the RFID tag is contaminated or located at an invisible position, and the RFID tag has already been put to practical use in a variety of areas such as commodity management or inspection process.

Now, with regard to the RFID tag, if information associated with the RFID tag information other than the RFID tag information stored in the IC circuit part can be printed for use, it is convenient in that the associated information is visible from the user. Thus, a RFID label producing apparatus is conceivable which includes both a label printing functionality and wireless communication functionality for producing RFID labels by applying the RFID system to the prior art, and writing the RFID tag information into the RFID circuit element as well as printing the information associated with the RFID tag information.

However, newly employing a RFID label producing apparatus of the above arrangement eliminates the need for conventionally used tape printing apparatuses, which may result in economical inefficiency as well. Therefore, producing the RFID labels while utilizing existing tape printing apparatus has been desired.

SUMMARY OF THE INVENTION

It is an object of the present invention to provide an apparatus for fixing RFID tags capable of producing RFID labels while utilizing existing printing apparatus.

BRIEF DESCRIPTION OF THE DRAWING

FIG. 1 is a system configuration diagram illustrating a print label producing system including a print label producing apparatus.

FIG. 2 is a conceptual block diagram illustrating the detailed structure of the print label producing apparatus included the producing system of FIG. 1.

FIG. 3 is an explanatory drawing for illustrating a detailed structure of a cartridge mounted on the print label producing apparatus of FIG. 2.

FIG. 4 is a fragmentary view from an arrow E direction in FIG. 3 illustrating the detailed structure of the print label tape of FIG. 2 seen from a cover film.

FIG. 5 is a top view illustrating an exemplary appearance of the print label formed after completion of the cutting of the print label tape.

FIG. 6 is a transverse sectional view of the cross section taken along VIa-VIa' in FIG. 5 and a transverse sectional view of the cross section taken along VIb-VIb' in FIG. 5.

FIG. 7 is a system configuration diagram illustrating a RFID tag producing system including an apparatus for fixing RFID tags of an embodiment of the present invention.

FIG. 8 is a conceptual block diagram illustrating the detailed structure of an apparatus for fixing RFID tags provided in the RFID tag producing system of FIG. 7.

FIG. 9 is a conceptual explanatory view illustrating a detailed structure of a device for fixing a RFID tag provided in the apparatus for fixing RFID tags of FIG. 8.

FIG. 10 is a functional block diagram illustrating a detailed function of a radio frequency circuit provided in the apparatus for fixing RFID tags of FIG. 8.

FIG. 11 is a functional block diagram illustrating a functional configuration of a RFID circuit element fixed by the fixing apparatus for fixing RFID tags of FIG. 8.

FIG. 12A is a top view illustrating an exemplary appearance of a RFID label produced by the fixing apparatus for fixing RFID tags of FIG. 8, FIG. 12B is a transverse sectional view of the cross section taken along XIIb-XIIb' in FIG. 12A, and FIG. 12C is a longitudinal sectional view of the cross section taken along XIIc-XIIc' in FIG. 12A.

FIG. 13 is a diagram illustrating an exemplary screen displayed on a terminal or a general purpose computer, when accessing RFID tag information of an IC circuit part of the RFID circuit element by the apparatus for fixing RFID tags of FIG. 8.

FIG. 14 is a flowchart illustrating control procedure executed by a control circuit when fixing the RFID circuit element on the print label by the apparatus for fixing RFID tags of FIG. 8, and writing tag information into the RFID circuit element to form the RFID label having the tag information written therein.

FIG. 15 is a flow chart illustrating the detailed procedure of step S200 shown in FIG. 14.

FIG. 16 is a conceptual block diagram illustrating the detailed structure of the apparatus for fixing RFID tags of a variation having a display device configured to display tag information corresponding to barcode information.

FIG. 17 is a flow chart illustrating the control procedure executed by the control circuit of the apparatus for fixing RFID tags of the variation of FIG. 16.

FIG. 18 is a top view illustrating the appearance of the variation of the RFID label.

DETAILED DESCRIPTION OF THE PREFERRED EMBODIMENTS

An embodiment of the present invention will be described below, referring to the drawings. In the present embodiment, RFID labels are formed by a fixing apparatus for fixing RFID tags which fixes a RFID circuit element on a print label produced by a print label producing apparatus. Details of the print label producing apparatus and the apparatus for fixing RFID tags will be described in order below.

(A) Arrangement and Operation of the Print Label Producing Apparatus

FIG. 1 is a system configuration diagram illustrating a print label producing system 1 including the print label producing apparatus.

In FIG. 1, the print label producing system 1 includes a print label producing apparatus 2 configured to produce a print label S. The print label producing apparatus 2 is connected to a terminal 5 and a general purpose computer 6 via a wired or wireless communication line 3.

FIG. 2 is a conceptual block diagram illustrating the detailed structure of the print label producing apparatus 2.

In FIG. 2, a cartridge holder part (not shown) is provided as a recess in a main body 8 of the print label producing apparatus 2, the holder part having a cartridge 40 detachably mounted thereon.

The main body 8 includes a housing 9 forming the outer periphery and having the cartridge holder part receiving the cartridge 40 fitted therein; a print head (thermal head in this example) 10 as a printing device configured to carry out a predetermined label print (printing) on a cover film (base layer) 34 having a barcode BC (see FIG. 4) provided thereon as an optical detector; a ribbon take-up roller drive shaft 11 configured to drive an ink ribbon 36 (thermal transfer ribbon, although unnecessary when the base layer is a thermal tape) which has finished printing on the cover film 34; a tape-feeding-roller drive shaft 12 configured to feed out the cover film 34 which has received the label print thereon and the base tape 32, while bonding them together, from the cartridge 40 as the print label tape 50; a cutter 15 configured to cut the print label tape 50 into a predetermined length at a given timing to produce a label-shaped print label S (details will be described below); a feeding roller 17 configured to transport the tape 50 after having been cut (=print label S) to the carry-out exit 16 and feeding it therefrom; and a sensor 18 configured to detect the presence of the print label S at the carry-out exit 16.

In addition, the main body 8 also includes a cartridge shaft drive motor 23 configured to drive the above-mentioned ribbon take-up roller drive shaft 11 and the tape-feeding-roller drive shaft 12; a cartridge shaft drive circuit 24 configured to control the drive of the cartridge shaft drive motor 23; a print-head drive circuit 25 configured to control the power supply to the print head 10; a solenoid 26 configured to drive the cutter 15 to perform the cutting operation; a solenoid drive circuit 27 configured to control the solenoid 26; a tape-feeding-roller motor 28 configured to drive the feeding roller 17; a tape-feeding-roller drive circuit 29 configured to drive the tape-feeding-roller motor 28; and a control circuit 30 configured to control the entire operation of the print label producing apparatus 2 via the cartridge shaft drive circuit 24, the print-head drive circuit 25, the solenoid drive circuit 27, and the tape-feeding-roller drive circuit 29.

The control circuit 30, being a so-called micro computer and hence its detailed illustration omitted, includes a CPU or the central processing unit, a ROM and a RAM, and is arranged to execute signal processing according to the program preliminarily stored in the ROM, using temporary storage function of the RAM. In addition, the control circuit 30 is connected to the communication line 3 via an input/output interface 31, and is capable of exchanging information with the above-mentioned another terminal 5 and the general purpose computer 6 connected to the communication line 3.

FIG. 3 is an explanatory drawing for illustrating the detailed structure of the cartridge 40.

In FIG. 3, the cartridge 40 includes a housing 40A; a first roll 33 provided inside the housing 40A and having the belt-shaped base tape 32 wound thereon; a second roll 35 with the transparent cover film 34 wound thereon, the transparent cover film 34 having a width approximately the same as that of the base tape 32; a ribbon take-up roller 38 configured to feed out the ink ribbon 36 (thermal transfer ribbon, although unnecessary when the cover film is a thermal tape) and taking up the ribbon 36 after the printing; and a tape feeding roller 39 configured to feed the print label tape 50, while pressing and bonding the base tape 32 and the cover film 34 to form the print label tape 50, in the direction shown by the arrow C.

The first roll 33 is formed by winding the base tape 32 around a reel member 33a.

The base tape 32, having a four-layer structure (see partially enlarged view of FIG. 3) in this example, is formed by laminating, from the side inward wound (right-hand side of FIG. 3) toward the opposite side (left-hand side of FIG. 3), an adhesive layer 50a composed of an appropriate adhesive, a base film 50b (base layer) composed of PET (polyethylene terephthalate) or the like, an adhesive layer 50c (affixing adhesive layer) composed of an appropriate adhesive, and a separation sheet 50d (separation material layer) in this sequence.

The adhesive layer 50a is formed on the upper side of the base film 50b (right-hand side of FIG. 3) for bonding the cover film 34 later, and the separation sheet 50d is bonded to the base film 50b, by the adhesive layer 50c, on the backside of the base film 50b (left-hand side of FIG. 3). Here, the separation sheet 50d is provided in order to allow the RFID label T, which is formed by fixing the RFID circuit element on the print label S, to be bonded on a predetermined object to be affixed via the adhesive layer 50C by peeling off the sheet, when affixing the RFID label T to the object to be affixed.

In addition, predetermined identifiers (reference mark PM. See FIG. 6B described below) are provided, with a predetermined interval corresponding to the print label S to be produced, as reference of transport control of the print label tape 50 on the surface of the separation sheet 50d.

The second roll 35 is formed by winding the cover film 34 around the reel member 35a.

The ribbon take-up roller 38 and the tape feeding roller 39 are driven to rotate by transmitting the driving force of the cartridge shaft drive motor 23 (see FIG. 2 above-mentioned) such as a pulse motor provided outside the cartridge 40 to the ribbon take-up roller drive shaft 11 and the tape-feeding-roller drive shaft 12, respectively.

In the cartridge 40 of the above-mentioned arrangement, the base tape 32 fed out from the first roll 33 is supplied to the tape feeding roller 39. With regard to the cover film 34 fed out from the second roll 35, it is arranged such that the ink ribbon 36 driven by the ribbon supply side roll 37 and the ribbon take-up roller 38 provided on the back side of the cover film 34 (i.e., the side which will be bonded to the base tape 32) is pressed by the print head 10 to contact the back side of the cover film 34.

Then, the cover film 34 and the ink ribbon 36 are held between the print head 10 and the platen roller 42, whereas the base tape 32 and the cover film 34 are held between the tape feeding roller 39 and the sub-roller 41. Then the ribbon take-up roller 38 and the tape feeding roller 39 are driven to rotate in synchronization, respectively, in the directions shown by arrows B and D by the driving force of the cartridge shaft drive motor 23. At this time, the above-mentioned tape-feeding-roller drive shaft 12, the sub-roller 41, and the platen roller 42 are coupled by a gear (not shown) so that the tape feeding roller 39, the sub-roller 41, and the platen roller 42 rotate as the tape-feeding-roller drive shaft 12 is driven, whereby the base tape 32 is fed out from the first roll 33 and supplied to the tape feeding roller 39 as mentioned above. At the same time, the cover film 34 is fed out from the second roll 35 and a plurality of heating elements of the print head 10 is power-supplied by the print-head drive circuit 25. As a result, a print R (see FIG. 5 described below) is printed on the back side of the print area of the cover film 34. Then, the base tape 32 and the cover film 34 on which the printing has been completed are bonded and integrated by the tape feeding roller 39 and the sub-roller 41, the print label tape 50 is formed and carried out of the cartridge 40. The ink ribbon 36 which has completed the printing on the cover film 34 is taken up by the ribbon take-up roller 38 driven by the ribbon take-up roller drive shaft 11.

The print label tape 50 produced as described above is cut by a cutting mechanism 15 and formed into a print label S, which will be subsequently carried out of the main body 8 of the print label producing apparatus from the label carry-out exit 16 by a label carry-out mechanism (not shown).

FIG. 4 is a fragmentary view from an arrow E direction in FIG. 3 illustrating the detailed structure of the print label tape 50 seen from the cover film 34.

In FIG. 4, a plurality of portions to become print labels S (referred to as print label portion So, hereinafter) is provided on the print label tape 50 along the label transport direction, with each print label portion So being divided with preceding and following print label portions So by the cutter 15 according to the cutting (planned) position CL.

On the back side of the cover film 34 of the print label tape 50, a label print R (text information corresponding to the tag information to be later stored in the RFID circuit element To described below, i.e., characters "RF-ID" in this example) and a one-dimensional barcode BC as an optical detector are printed so as to be a normal image when seen from above the cover film 34. Specifically, a barcode BC is provided in the downstream side margin in the transport direction relating to one of the print label portions So, and the label print R is provided on the barcode BC subsequently in the transport direction. Here, the downstream side margin Y between the label print R relating to one of the print label portions So and the downstream side cutting position CL is set to be a fixing part for fixing the RFID circuit element To which will be described below.

In addition, barcode information corresponding to the information to be written (tag information) to be stored in the RFID circuit element To is marked in the barcode BC and, as a result, the barcode information is associated with the print text information of the label print R. When the RFID circuit element To is fixed on the print label S by the apparatus for fixing RFID tags described below to produce the RFID label T, the barcode information is supposed to be read by scanning the barcode BC using the barcode sensor (which will be described below). Here, the optical detector, without being limited to the one-dimensional barcode, may be a two-dimensional barcode (QR code). Any detector other than a barcode may be used. Furthermore, without being limited to an optical detector, a magnetic stripe or the like may also be used.

FIG. 5 is a top view illustrating an exemplary appearance of the print label S formed after completion of the cutting of the print label tape 50 as described above. Additionally, FIG. 6A is a transverse sectional view of the cross section taken along VIa-VIa' in FIG. 5, and FIG. 6 (*b*) is a transverse sectional view of the cross section taken along VIb-VIb' in FIG. 5.

In FIGS. 5, 6A, and 6B, the print label S has a five-layer structure in which the cover film 34 is added to the four-layer structure shown in FIG. 3, with the cover film 34, the bonding adhesive layer 50*a*, the base film 50*b*, the affixing adhesive layer 50*c*, and the separation sheet 50*d* composing the five layers from the cover film 34 (upper side of FIG. 6) side toward the opposite side (lower side of FIG. 6).

At this time, the barcode BC and the label print R are printed on the back side of the cover film 34, as described above. In addition, the above-mentioned reference mark PM being a black identifier, for example, is provided on the surface of the separation sheet 50*d*. Here, in place of the reference mark PM, a hole substantially passing through the base tape 32 may be bored as the identifier by laser beam machining or the like.

As described above, the RFID label T is produced by fixing the RFID circuit element on the print label S arranged as above using the apparatus for fixing RFID tags of the present embodiment described below. Next, the apparatus for fixing RFID tags will be described.

(B) Arrangement and Operation of the Apparatus for Fixing RFID Tags

FIG. 7 is a system configuration diagram illustrating a RFID tag producing system including the apparatus for fixing RFID tags of the present embodiment.

In the RFID tag producing system 51 shown in FIG. 7, an apparatus 52 for fixing RFID tags according to the present embodiment is connected to a route server 54, a terminal 55, a general purpose computer 56, and a plurality of information servers 57 via a wired or wireless communication line 53. As stated above, the apparatus 52 for fixing RFID tags is configured to produce the RFID label T by fixing the RFID circuit element To on the print label S when the print label S is fed in.

FIG. 8 is a conceptual block diagram illustrating the detailed structure of the apparatus 52 for fixing RFID tags.

In FIG. 8, the main body 58 of the apparatus 52 for fixing RFID tags includes a label insertion sensor 72 configured to detect insertion of the print label S inserted from the insertion slot 70; a first and a second feeding rollers 74 and 76 (feeding devices), each being a pair (including a drive roller and a driven roller) configured to receive and transporting the inserted print label S; a barcode sensor (reading device) 75 configured to read the information of the barcode BC provided on the print label S (see FIG. 5 described above); a device 66 for fixing a RFID tag (fixing device) configured to fix the tag base 61 having the RFID circuit element To on the print label S(=forming the RFID label T); a half cutter 77 configured to perform a half-cut at a half-cut position HC (see FIG. 12 described below) defined between the barcode BC in and the label print R on the print label S; an antenna 78 (communication device) configured to transmit and receiving signal with the RFID circuit element To fixed on the print label S and writing information therein by wireless communication using a predetermined radio frequency (such as UHF band, microwave band, medium-frequency wave band); a pair of feeding guides 79 configured to guide the RFID label T to the lower part of the antenna 78 and holding the RFID circuit element To in a predetermined access area opposing the antenna 78 when transmitting and receiving signals by wireless communication; a pair of tape feeding rollers 80 configured to transport the RFID label T with tag information written into the RFID circuit element To toward a carry-out exit 71 of the main body 58 and feeding it out of the main body 58; a sensor 82 configured to detect the presence of the RFID label T at the carry-out exit 71.

The main body 58 also includes a radio frequency circuit 83 configured to access (to perform reading or writing) the RFID circuit element To through the antenna 78; a signal processing circuit 84 configured to generate a information to be written signal to be written into the RFID circuit element To; a feeding motor 85 configured to drive the drive roller 74a of the first feeding roller 74 and the drive roller 76a of the second feeding roller 76; a feeding motor drive circuit 86 configured to control the drive of the feeding motor 85; a solenoid 89 configured to drive the half cutter 77 to perform the half-cut operation; a solenoid drive circuit 90 configured to control the solenoid 89; a tape-feeding-roller motor 91 configured to drive the tape feeding roller 80; a tape-feeding-roller drive circuit 92 configured to control the tape-feeding-roller motor 91; and a control circuit 93 configured to control the entire operation of the apparatus 52 for fixing RFID tags via the radio frequency circuit 83, the signal processing circuit 84, a tag fixing drive circuit 88 (described below), the solenoid drive circuit 90, the tape-feeding-roller drive circuit 92, and the like.

The control circuit 93, being a so-called micro computer and hence its detailed illustration omitted, includes a CPU or the central processing unit, a ROM and a RAM, and is arranged to execute signal processing according to the program preliminarily stored in the ROM, using temporary storage function of the RAM. In addition, the control circuit 93 is connected to the communication line 53 via an input/output interface 94, and is capable of exchanging information with the above-mentioned route server 54, the terminal 55, the general purpose computer 56, the information server 57, and the like connected to the communication line 53.

When producing the RFID label T with the above arrangement, upon actuation of the apparatus 52 for fixing RFID tags by a predetermined production operation via the terminal 55 or the general purpose computer 56, the print label S received from the insertion slot 70 is transported by a first feeding roller 74. Then, after the information of the barcode BC provided on the cover film 34 has been read, the tag base 61 is fixed on the cover film 34 by the device 66 for fixing a RFID tag to form the RFID label T. In this manner, the RFID label T is composed of five layers, the cover film 34, the adhesive layer 50a, the base film 50b, the adhesive layer 50c, and the separation sheet 50d as shown in the enlarged view of FIG. 8, whereas the tag base 61 is disposed on the cover film 34 to provide a six-layer structure in this portion. Subsequently, tag information corresponding to the above-mentioned barcode information is written into the IC circuit part 151 of the RFID circuit element To through the antenna 78, then the RFID circuit element To is transported by the tape feeding roller 80 and carried out of the apparatus 52 for fixing RFID tags from the carry-out exit 71.

FIG. 9 is a conceptual view illustrating the detailed structure of the device 66 for fixing a RFID tag. In FIG. 9 and FIG. 8 described above, the device 66 for fixing a RFID tag includes a tag base cartridge 60 and a tag stamper 68 provided downstream in the label transport direction.

The tag base cartridge 60 includes a housing 64 configured to receive the laminated tag base (inlet) 61 having the RFID circuit element To. A plurality of compression springs 62 configured to press the tag base 61 downward is provided in the upper part of the housing 64, and a tag feeding roller 63 contacting the lowest tag base 61 provided at the bottom of the housing 64. Furthermore, the carry-out exit 65 of the tag base 61 is provided downstream side of the housing 64 in the transport direction of the print label S.

The tag feeding roller 63 is configured to drive, by its rotation, the tag base 61 inside the housing 64 and take it out one by one starting from the one at the bottom, transport the tag base 61 and carry it out of the tag base cartridge 60 from the carry-out exit 65, and supply it to the above-mentioned margin Y (see FIG. 4 described above) provided downstream side of the tag base cartridge 60 in the transport direction of the print label S which has been transported downward in FIG. 9. Here, the tag feeding roller 63 is driven by the driving force of the motor 87 to drive tag feeding roller (see FIG. 8) and furthermore, the motor 87 to drive tag feeding roller is driven and controlled by the tag fixing drive circuit 88 (see FIG. 8).

The tag stamper 68, being provided downstream side of the tag base cartridge 60 in the label transport direction in this example, includes a stamper body 68a and an eccentric cam 68b provided in contact with the top of the stamper body 68a. It is arranged such that, by pivoting the eccentric cam 68b using an eccentric cam drive mechanism which is not shown, the stamper body 68a is pressed and driven downward resisting a biasing unit not shown, and the tag base 61 provided on the margin Y (tag fixing part) of the print label S at the lower side of the stamper body 68a is pressed, whereby fixing the tag base 61 (in the other words, RFID circuit element To) on the margin Y. Subsequently, when the eccentric cam 68b pivots back to its original position from the pivoted position for pressing the tag base 61, the stamper body 68a is configured to return to its original position separate from the tag base 61 by the biasing force of the biasing unit.

FIG. 10 is a functional block diagram illustrating the detailed function of the radio frequency circuit 83. In FIG. 10, the radio frequency circuit 83 includes a transmitting portion 132 configured to transmit signals to the RFID circuit element To through the antenna 78, a receiving portion 133 configured to receive the reflected wave from the RFID circuit element To and received by the antenna 78, and an transmit-receive splitter 134.

The transmitting portion 132 includes a crystal oscillator 135, a PLL (Phase Locked Loop) 136, and a VCO (Voltage Controlled Oscillator) 137 configured to generate a carrier wave to access (perform reading or writing) the RFID tag information of the IC circuit part 151 of the RFID circuit element To; a transmission multiplying circuit 138 (or a variable amplification factor amplifier may be used in the case of amplitude modulation) configured to modulate the generated carrier wave based on the signal provided from the signal processing circuit 84 (amplitude modulation based on the "TX_ASK" signal from the signal processing circuit 84, in this example); and a variable transmission amplifier 139 configured to amplify the modulated wave which has been modulated by the transmission multiplying circuit 138 with the amplification factor determining by the "TX_PWR" signal from control circuit 93. The generated carrier wave uses the frequency of a predetermined radio frequency (e.g., UHF band, microwave band, medium-frequency wave band), and the output of the transmission amplifier 139 is transmitted to the antenna 78 via the transmit-receive splitter 134 and supplied to the IC circuit part 151 of the RFID circuit element To. Here, the RFID tag information is not limited to the modulated signal described above and may be simply a carrier wave.

The receiving portion 133 includes a first receiving signal multiplying circuit 140 configured to multiply the reflected wave from the RFID circuit element To which is received by the antenna 78 and the generated carrier wave; a first band-pass filter 141 configured to extract only the signals in the necessary band from the output of the first receiving signal multiplying circuit 140; a first receiving signal amplifier 143 configured to amplify the output of the first band-pass filter 141; a first limiter 142 configured to further amplify the output of the first receiving signal amplifier 143 and converting it into a digital signal; a second receiving signal multiplying circuit 144 configured to multiply the reflected wave from the RFID circuit element To which is received by the antenna 78 and the carrier wave whose phase is delayed 90 degrees by the phase shifter 149 after its generation; a second band-pass filter 145 configured to extract only the signals in the necessary band from the output of the second receiving signal multiplying circuit 144; a second receiving signal amplifier 147 configured to amplify the output of the second band-pass filter 145; and a second limiter 146 configured to further amplify the output of the second receiving signal amplifier 147 and converting it into a digital signal. Then, the signal "RXS-I" which is output from the first limiter 142 and the signal "RXS-Q" which is output from the second limiter 146 are input to the signal processing circuit 84 and processed therein.

In addition, the outputs of the first receiving signal amplifier 143 and the second receiving signal amplifier 147 are also input to the RSSI (Received Signal Strength Indicator) circuit 148, so that a signal "RSSI" indicating the intensity of these signals are input to the signal processing circuit 84. In this manner, the apparatus 52 for fixing RFID tags of the present embodiment performs demodulation of the reflected wave from the RFID circuit element To by I-Q quadrature demodulation.

FIG. 11 is a functional block diagram illustrating the functional configuration of the RFID circuit element To. In FIG. 11, the RFID circuit element To includes an antenna 152 configured to perform transmission and reception of signals contactlessly using radio frequencies such as UHF band; and the above-mentioned IC circuit part 151 connected to the antenna 152.

The IC circuit part 151 includes a rectification part 153 configured to rectify the carrier wave received by the antenna 152; a power source part 154 configured to accumulate the energy of the carrier wave rectified by the rectification part 153 as the driving power source of IC circuit part 151; a clock extraction part 156 configured to extract the clock signal from the carrier wave received by the antenna 152 and providing it to the control part 155; a memory part 157 capable of storing predetermined information signals, a modem part 158 connected to the antenna 152; and a control part 155 configured to control the operation of the RFID circuit element To via the rectification part 153, the clock extraction part 156, and the modem part 158.

The modem part 158 demodulates the communication signals originated from the antenna 78 of the tag label producing apparatus 2 and received by the antenna 152, and modulates the carrier wave received by the antenna 152 based on the reply signal from the control part 155 and retransmits it as reflected wave from the antenna 152.

The control part 155 interprets the received signal which has been demodulated by the modem part 158, generates a reply signal based on the information signal stored in the memory part 157, and performs basic controls such as controlling the reply by the modem part 158.

The clock extraction part 156, being configured to extract clock components from the received signals to extract clocks for the control part 155, supplies clocks corresponding to the speed of the clock components of the received signals to the control part 155.

FIG. 12A is a top view illustrating an exemplary appearance of the RFID label T having tag information written into the RFID circuit element To after fixing of the RFID circuit element To the print label S has been completed by the apparatus 52 for fixing RFID tags. Additionally, FIG. 12B is a transverse sectional view of the cross section taken along XIIb-XIIb' in FIG. 12A, and FIG. 12C is a transverse sectional view of the cross section taken along XIIc-XIIc' in FIG. 12A.

In FIGS. 12A, 12B and 12C, the RFID label T has a substantially five-layer structure as described above (the portion including the tag base 61 is a six-layer structure) In other words, the cover film 34, the adhesive layer 50a, the base film 50b, the adhesive layer 50c, and the separation sheet 50d compose the five layers from the cover film 34 side (upper part of FIGS. 12B and 12C) toward the opposite side (lower part of FIGS. 12B and 12C), and a label print R (characters "RF-ID") is printed by the print head 10, following the barcode BC located at one end (downstream in the transport direction when transporting the label) back of cover film 34 as described above. In addition, the tag base 61 fixed by the device 66 for fixing a RFID tag is bonded on the margin Y on the top at the other end of the cover film 34 (upstream in the transport direction when transporting the label) by an appropriate adhesion device (adhesion layer 61a provided at the bottom surface of the tag base 61, in this example).

In addition, a half-cut line HC is formed at a predetermined half-cut position between the barcode BC and the label print R of the RFID label T, by which the components of the five-layer structure other than the separation sheet 50d, i.e., the cover film 34, the adhesive layer 50a, the base film 50b, and the adhesive layer 50c are separated by the half cutter 77.

At this time, when the RFID circuit element To is fixed on the print label S to form the RFID label T, the information to be written (tag information) corresponding to the barcode information which has been read by scanning the barcode BC with the barcode sensor 75 as described above is written into the RFID circuit element To of the RFID label T, via wireless communication through the antenna 78.

FIG. 13 illustrates an exemplary screen displayed on the above-mentioned terminal 55 or the general purpose computer 56, when accessing (reading or writing) the RFID tag information of the IC circuit part 151 of the RFID circuit element To by the apparatus 52 for fixing RFID tags as described above.

In the example of FIG. 13, tag label classification, the above-mentioned print letters R, access (reading or writing) ID which is an ID unique to the RFID circuit element To, address of the article information of the object indicated by the RFID label T stored in the information server 57, storage address of the corresponding information in the route server 54, or the like can be displayed on the terminal 55 or the general purpose computer 56.

Note that, although an example is shown in the above description such that accessing (reading or writing) is performed with the feeding guide 79 being held in the access area relative to the moving RFID label T along with the printing operation, the invention is not limited to the foregoing and the accessing may be performed with the RFID label T stopping at a predetermined position and being held by the feeding guide 79.

In addition, when reading or writing as described above, correspondence between the ID of generated RFID label T and the information read from the IC circuit part 151 of the RFID label T (or the information written into the IC circuit part 151) is stored in the above-mentioned route server 54 and can be referred as needed.

FIG. 14 is a flow chart illustrating the control procedure executed by the control circuit 93 when fixing the RFID circuit element To on the print label S and writing the tag information into the RFID circuit element To form the RFID label T having the tag information written therein.

In FIG. 14, the flow is started when, for example, a predetermined RFID label producing operation is performed from the terminal 55 or the general purpose computer 56 on the apparatus 52 for fixing RFID tags. First, in step S110, it is determined, based on the detection signal of the label insertion sensor 72 which is input via the input/output interface 94, whether or not the operator has inserted the print label S from the insertion slot 70 of the main body 58. As long as the determination is not satisfied, the procedure is repeated until insertion of the print label S is detected, and upon detection of insertion the process flow proceeds to the next step S115. Here, it is assumed that the print label S is inserted into the insertion slot 70 of the main body 58 from one end of the longitudinal direction of the label having the barcode BS provided thereon.

In step S115, a control signal is output to the feeding motor drive circuit 86 via the input/output interface 94, and drive rollers 74a and 76a of the first and the second feeding rollers 74 and 76 are driven to rotate by the feeding motor 85 to start transport of the print label S.

The transport causes the print label S to travel, with the barcode BS being at the top, and when a predetermined time has passed from the start of transporting the print label S, the barcode BC passes the position of the barcode sensor 75, and the barcode BC is scanned by the barcode sensor 75, reading the barcode information (tag information). In the next step S120, it is determined whether or not the reading of the barcode information by the barcode sensor 75 has completed. If the determination is satisfied, the process flow proceeds to step S125. Here, the barcode information read by the barcode sensor 75 is sent to the control circuit 93 via the input/output interface 94.

The print label S having its barcode information read as described above subsequently passes near the tag base cartridge 60 after a predetermined time has passed since the barcode information reading was completed, and the downstream side margin Y of the print label S in the transport direction reaches the position of the tag stamper 68. In step S125, accordingly, a control signal is output to the feeding motor drive circuit 86 to stop driving the feeding motor 85, whereby stopping the rotation of the drive rollers 74a and 76a of the first and the second feeding rollers 74 and 76. In this manner, transport of the print label S by the first and the second feeding rollers 74 and 76 is stopped so that the downstream side margin Y of the print label S in the transport direction comes to the lower part of the tag stamper 68.

The process flow then proceeds to step S130 where a control signal is output to the tag fixing drive circuit 88, the tag feeding roller 63 of the tag base cartridge 60 is driven to rotate by the motor 87 to drive tag feeding roller, the tag base 61 received within the tag base cartridge 60 is transported, and the tag base 61 is provided on the margin Y of the print label S located at the lower part of the tag stamper 68. At the same time, a control signal is output to the tag stamper 68, the stamper body 68a is driven downward, as described in FIG. 9, by pivoting the eccentric cam 68b, and the tag base 61 is pressed against the tag fixing part provided on the margin Y of the print label S in the stamper body 68a. In this manner, the tag base 61 is fixed on the tag fixing part of the print label S by adhesion using the adhesion layer 61a provided on the lower surface of the tag base 61, forming the RFID label T having the RFID circuit element To fixed on the print label.

Subsequently, the process flow proceeds to step S135 where a control signal is output to the tag fixing drive circuit 88, the rotational drive of the motor 87 to drive tag feeding roller is stopped, the feed of the tag base 61 by the tag feeding roller 63 is stopped, and a control signal is output to the tag damper 68 and the tag damper 68 is brought back to its original position separated from the tag base 61. Furthermore, a control signal is output to the feeding motor drive circuit 86 and the feeding motor 85 is driven to rotate again. In addition, a control signal is output to the tape-feeding-roller drive circuit 92, whereby the driving of the tape-feeding-roller motor 91 is started and tape feeding roller 80 is rotated. In this manner, transport of the print label S (=RFID label T) having the RFID circuit element To fixed thereon is restarted by the first and the second feeding rollers 74 and 76, and the tape feeding roller 80.

Then, in step S140, it is determined whether or not the half-cut position defined between the barcode BC and the label print R located upstream side of the RFID label T in the transport direction has reached, due to the transport, a position facing the half cutter 77. If the determination is satisfied, the process flow proceeds to step S145. Here, the determination may be based on, for example, whether a predetermined time has passed since the start of transporting the RFID label T, or it has been transported for a predetermined length.

In step S145, similarly as with step S125, a control signal is output to the feeding motor drive circuit 86 and the tape-feeding-roller drive circuit 92 to stop driving the feeding motor 85 and the tape-feeding-roller motor 91, whereby transport of the RFID label T by the first and the second feeding rollers 74 and 76 and the tape feeding roller 80 is stopped. In this manner, the half-cut position of the RFID label T comes to a position facing the blade part of the half cutter 77.

Subsequently, in step S150, a control signal is output to the solenoid drive circuit 90 to drive the solenoid 89, and the half-cut line HC is formed on the RFID label T using the blade part of the half cutter 77. In this manner, the RFID label T having the half-cut line HC formed between the barcode BC and the label print R is provided as shown in FIG. 12A described above. Here, the formation of the half-cut Line HC may be omitted as appropriate.

Next, the process flow proceeds to step S155 where a control signal is output to the feeding motor drive circuit 86 to drive to rotate the feeding motor 85 and the tape-feeding-roller motor 91 again, and transport of the RFID label T by the first and the second feeding rollers 74 and 76 and the tape feeding roller 80 is restarted, similarly as with step S115.

The tag base 61 of the RFID label T, being fixed downstream side in its transport direction, reaches the position of the antenna 78 due to the transport. In the following step S200, after specifying the tag ID configured by reading the barcode information in step S120 and performing memory initialization (erasing) for writing information therein, tag information (RFID tag information obtained by decoding the barcode information) corresponding to the barcode information is transmitted to the RFID circuit element To of the tag base 61 and written therein (see FIG. 15 described below for details). When step S200 is finished, the process flow proceeds to step S160.

In step S160, the combination of the tag information written into the RFID circuit element To in step S200 and the print information of the label print R already printed on the print label S is output, via the input/output interface 94 and the communication line 53, and stored in the information server 57 and the route server 54. Here, the stored data is stored and held in, for example, a data base which can be referred from the terminal 55 or the general purpose computer 56 if necessary.

Subsequently, the process flow proceeds to step S165 where a control signal is output to the tape-feeding-roller drive circuit 92 to restart the drive of the tape-feeding-roller motor 91, whereby the tape feeding roller 80 rotates. In this manner, transport by the tape feeding roller 80 is restarted, and the RFID label T having the tag information written into the RFID circuit element To in step S200 is transported toward the carry-out exit 71, and furthermore, carried out of the apparatus 52 from the carry-out exit 71.

FIG. 15 is a flow chart illustrating the detailed procedure of step S200.

First, in step S305 of FIG. 15, the barcode information read in step S120 of FIG. 14 is decoded to recognize the tag information corresponding to barcode information, then the process flow proceeds to step S310. Here, step S305 constitutes an information identifying device for identifying the information to be written corresponding to the optical detector which has been read by the reading device described in respective claims.

In step S310, the route server 54 is accessed, for example, and the tag ID for the RFID circuit element To (in other words, that corresponding to the information recognized in step S305) of the RFID label T, which will be an object to be written.

Subsequently, in step S320, an "Erase" command is output to the signal processing circuit 84, the command specifying the tag ID (all or some) configured in step S310 to initialize the information stored in the memory part 157 of the RFID circuit element To. As a result, an "Erase" signal as the access information is generated in the signal processing circuit 84 and transmitted via the radio frequency circuit 83 to the RFID circuit element To being the object to be written, and the memory part 157 is initialized.

Next, in step S330, a "Verify" command for verifying the content of the memory part 157 is output to the signal processing circuit 84, similarly as described above. Accordingly, a "Verify" signal as the access information is generated in the processing circuit 84, transmitted via the radio frequency circuit 83 to the RFID circuit element To which is the object to be written, and prompts a reply. Subsequently, in step S340, the reply signal transmitted, corresponding to the "Verify" signal, from the RFID circuit element To which is the object to be written is received through the antenna 78, and captured via the radio frequency circuit 83 and the signal processing circuit 84.

Next, in step S350, the information in the memory part 157 of the RFID circuit element To is verified and it is determined whether or not the memory part 157 has been normally initialized, based on the reply signal. If the determination is not satisfied, the process flow proceeds to step S360 where one is added to M, and it is further determined in step S370 whether or not M reached a preliminarily defined number of re-tries (five times in this example). If $M \leq 4$, the determination is not satisfied and the process flow returns to step S320 where a similar procedure is repeated. If M=5 the process flow proceeds to step S380 where an error display signal is output to the terminal 55 or the general purpose computer 56 via the input/output interface 94 and the communication line 53, whereby displaying the corresponding write-failure (error). In this manner, up to five retries will be performed even if initialization has failed. When step S380 is finished, the flow terminates.

If, on the other hand, the determination result in step S350 is satisfied, the process flow proceeds to step S390 where a "Program" command is output to the signal processing circuit 84, the command writing the desired data to the memory part 157. Accordingly, a "Program" signal is generated in the signal processing circuit 84 as the access information including the information which has been input and operated via the terminal 55 or the general purpose computer 56 and is to be written into the IC circuit part 151 of the RFID circuit element To, and transmitted via the radio frequency circuit 83 to the RFID circuit element To being the object of information writing, then the information which has been input and operated via the terminal 55 or the general purpose computer 56 is written into the memory part 157.

Subsequently, in step S400, a "Verify" command is output to the signal processing circuit 84. Accordingly, a "Verify" signal as the access information is generated in the signal processing circuit 84 and transmitted via the radio frequency circuit 83 to the RFID circuit element To which is the object of information writing, prompting a reply. Subsequently, in step S410, a reply signal transmitted, corresponding to the "Verify" signal, from the RFID circuit element To being the object to be written is received through the antenna 78, and captured via the radio frequency circuit 83 and the signal processing circuit 84.

Next, in step S420, the information stored in the memory part 157 of the RFID circuit element To is verified and it is determined whether or not the predetermined information transmitted has been normally stored in the memory part 157, based on the reply signal.

If the determination is not satisfied, the process flow proceeds to step S430 where one is added to N, and it is further determined in step S440 whether or not N reached a preliminarily defined number of re-tries (five times in this example, but any number of times may be set as appropriate). If $N \leq 4$, the determination is not satisfied and the process flow returns to step S390 where a similar procedure is repeated. If N=5 the process flow proceeds to step S380 where write-failure (error) corresponding to the terminal 55 or the general purpose computer 56 is displayed and the flow terminates. In this manner, up to five retries will be performed even if initialization has failed.

If, on the other hand, the determination result in step S420 is satisfied, the process flow proceeds to step S450 where a "Lock" command is output to the signal processing circuit 84. Accordingly, a "Lock" signal is generated in the signal processing circuit 84, similarly as described above, and transmitted via the radio frequency circuit 83 to the RFID circuit element To being the object of information writing, whereby newly writing information into the RFID circuit element To is prohibited. In this manner, writing of tag information into the RFID circuit element To which is the object of information writing is completed. When step S450 is finished, the flow terminates.

According to the above-mentioned routine, tag information printed on the label print R of the print label S can be written into the RFID circuit element To of the RFID label T.

In the apparatus 52 for fixing RFID tags of the present embodiment arranged as above, the print label S having a predetermined label print R carried out on the print area is received and transported, and the tag base 61 provided with a RFID circuit element To is fixed by the device 66 for fixing a RFID tag on the tag fixing part provided on the print label S, whereby the RFID label T is formed. In the course of producing the RFID label T, the barcode BC preliminarily provided on the print label S is read by the barcode sensor 75, and the tag information corresponding to the barcode information which has been read by the barcode sensor 75 is written into the RFID circuit element To of the produced RFID label T through the antenna 78 via wireless communication, whereby the RFID label T having the tag information written on the RFID circuit element To is completed. Since the barcode BC in the print label S is associated with the label print R carried out on the print area on this occasion, a RFID label T with print can be produced in which the label print R and the tag information to be stored in the RFID circuit element To are associated with each other.

Therefore, the RFID label T with print can be produced by simply producing the print label S using an existing printing apparatus such as the print label producing apparatus 2 shown in FIG. 2, and newly adding the apparatus 52 for fixing RFID tags of the present embodiment shown in FIG. 5 to the printing apparatus. As a result, producing cost can be reduced compared with newly preparing a RFID label producing apparatus having both of functionalities of label printing and wireless communication.

In addition, particularly with the present embodiment, since the tag information is written through the antenna 78 into the RFID circuit element To after fixing the RFID circuit element To on the print label S, communication can be performed in a stable condition after the fixing, whereby reliability of data writing of the tag information can be improved.

In addition, particularly with the present embodiment, a barcode BC is provided on the print label S separately from the label print R (text information) so that information is written into the RFID circuit element To based on the information of the separately provided barcode BC, but not that of the label print R of the print label S. At this time, by associating the printed text information with the barcode information of the label print R based on another correlation, there are advantages such as: the print label S can be produced using a tape having barcode information preliminarily printed thereon; variation of managing objects (articles) can be enriched by utilizing the correlation; or a plurality of RFID labels T can be produced to have identical text information but different sets of information to be written.

In addition, particularly with the present embodiment, it is arranged such that the barcode BC is provided on the margin located downstream in the label transport direction outside the area of the label print R of the print label S, the RFID label T formed on the basis of the print label S has a half-cut line HC drawn between the print area and the margin, and the portion except the margin of the RFID label T is bonded on the object. In this manner, when affixing the RFID label T on the object, the barcode BC can not be affixed on the object whereby improving the appearance after the affixing.

Here, it may be arranged so that the barcode BC is formed by ink-jet printing using infrared reading ink, and the barcode information is read using infrared radiation. Since the barcode formed using infrared reading ink is invisible to human eyes, a RFID label having a higher security without letting outsiders is aware of the existence of the barcode. Additionally, the invisibility of the barcode can improve the appearance of the label.

In addition, although the print label S used a base layer having a laminated cover film 34 to provide the label print R on the cover film 34, the present invention is not limited to the foregoing. In other words, a print label S composed of an image receiving tape which provides the label print by ink-jet printing, a receptor tape which provides the label print by transfer printing, or a thermal tape which provides the label print by thermal printing may be used.

Although an embodiment of the present invention has been described above, various modifications of the present invention which is not limited to the above embodiment can be made without deviating from the sprit and scope of its technical concept. Such variations will be described below.

(1) When Displaying Tag Information Corresponding to the Barcode Information

Although it has been arranged in the above-mentioned embodiment such that, when the barcode BC of the print label S is read by the barcode sensor 75, the tag information (information to be written) corresponding to the barcode information can be automatically written, as it is, into the RFID circuit element To fixed on the print label S, the present invention is not limited to the foregoing. In other words, there may be one or more sets of tag information corresponding to the barcode information, and by displaying the tag information on the display device and allowing the operator to verify or select the displayed tag information, the verified or selected tag information can be written into the RFID circuit element To.

FIG. 16 is a conceptual block diagram illustrating the detailed structure of a fixing apparatus for fixing RFID tags of the above variation. A apparatus 52A for fixing RFID tags of the variation is different from the apparatus 52 for fixing RFID tags of the embodiment shown in FIG. 8 in that the former includes a touch panel (display device, operation device) 95 configured to display the tag information. Other elements of the apparatus 52A for fixing RFID tags of the present variation are basically the same as those of the apparatus 52 for fixing RFID tags of the embodiment shown in FIG. 8. In FIG. 16, the parts identical to those in FIG. 8 bear the same numerals, with their description omitted as appropriate.

In the apparatus 52A shown in FIG. 16, the touch panel 95 is connected to the control circuit 93 so that when the barcode BC of the print label S is read by the barcode sensor 75 one or more sets of tag information corresponding to the barcode information which has been read is displayed on the touch panel 95. In this manner, the operator may view the one or more sets of tag information displayed on the touch panel 95 and touch the displayed portion of the tag information (or may operate via an operation device provided in the terminal 55) to verify (when a plurality of sets of tag information is displayed, select one of the tag information among them) the tag information to be written into the RFID circuit element To. In addition, other types of display device (such as LCD) may be used, without being limited to the touch panel 95.

FIG. 17 is a flow chart illustrating the control procedure executed by the control circuit 93 when forming the RFID label T using the apparatus 52A of the present variation, which is equivalent to FIG. 14 described above.

The flow of FIG. 17 is different from the flow chart shown in FIG. 14 in that steps S170 to S180 are newly added between steps S125 and S130. In other words, after reading the barcode BC of the print label S in step S120 is finished, and label transport in step S125 is stopped, the process flow proceeds to step S170.

In step S170, the barcode information obtained in step S120 is decoded and one or more sets of tag information corresponding to the barcode information is recognized, then the process flow proceeds to step S175.

In step S175, a display signal is output on the touch panel 95 to display the one or more sets of tag information decoded in step S170 on the touch panel 95. In this manner, the operator is promoted to verify the tag information displayed on the touch panel 95 (or select one set of tag information when a plurality of sets of tag information is displayed).

Subsequently, the process flow proceeds to step S180 where it is determined whether or not the operator has verified, as described above, a set of the tag information displayed on the touch panel 95 (or selected a set of tag information from a plurality of sets of tag information). If the operator has performed the verification or selection, the determination result of step S180 is satisfied and the process flow proceeds to step S130, where the above-mentioned steps S130 to S165 are gone through and the flow is finished.

According to the present variation, the RFID label T can be produced with certainty, confirming the operator's will, and additionally, when there exists a plurality of sets of information to be written (candidates) corresponding to the barcode information, one set of information to be written can be selected with certainty from the plurality of sets of information, narrowing down the candidate.

(2) When Reading Text Information of the Print Label and Writing the Corresponding Information to be Written into the RFID Circuit Element In the above-mentioned embodiment and variation of (1), although the barcode BC as the optical detector provided in the print label S is read by the barcode sensor 75, and the information to be written corresponding to the barcode information is written into the RFID circuit element To via wireless communication to produce the RFID label T, the present invention is not limited to the foregoing. In other words, it may be arranged such that the text information of the label print R printed in the print area of the print label S may be used as the optical detector in itself, which is read by an appropriate reading device and passed to image recognition or character recognition performed by known methods, then the information to be written corresponding to the recognized text information is written into the RFID circuit element To via wireless communication to produce the RFID label T.

In this manner, since information is written based on the text information (print) formed on the print area of the print label S, it is not necessary to newly provide an optical detector such as the barcode BC separately from the text information, whereby simplifying the structure of the print label S and RFID label T. Additionally, for example, it becomes unnecessary to define the correlation between the text information as the optical detector and the information to be written, by writing the printed text information itself into the RFID circuit element To, whereby simplifying the control processing.

(3) Others

In the above-mentioned, particularly in the embodiment, although the tag information is written into the RFID circuit element To after fixing the RFID circuit element To on the print label S, the present invention is not limited thereto. In other words, it may be arranged such that the RFID circuit element To is fixed on the print label S after having been written with the tag information.

In addition, the printing device may further perform the printing again on the RFID label T which has already had information written or print provided thereon. In this case, a print corresponding to the information written into the RFID circuit element To may be provided again, or a print which blacks out the barcode BC so that it can not be read after the information writing is finished.

In addition, the RFID circuit element To may be fixed outside the print area in the tape width as shown in FIG. 18. In this case, since a long element can be used as the antenna 152 without elongating the length of the tag label T, communication performance can be improved.

In addition, methods according to the above-mentioned embodiments or variations can be combined for use as appropriate, other than those already described above.

Note that, although not individually exemplified, the present invention can be implemented through various modifications without deviating from the scope of its spirit.

What is claimed is:

1. An apparatus for fixing RFID tags comprising:
a main body configured to form an outer shell of the apparatus;
an insertion slot configured to receive a print label comprising a desired print image printer in a print area, said insertion slot formed through said main body;
a feeding device configured to feed said print label received from said insertion slot to a downstream side along a feeding path, said feeding device disposed inside said main body;
a reading device configured to read an optical detector formed on said print label, said reading device disposed downstream from said insertion slot along said feeding path inside said main body;
an accommodating portion configured to accommodate a plurality of tag bases to be supplied disposed inside said main body, each of said tag base comprising an RFID circuit element comprising an IC circuit part configured to store information and an antenna configured to transmit and receive information;
a supplying device configured to supply said plurality of tag bases serially disposed inside said main body, said tag bases accommodated in said accommodating portion;
a fixing device configured to fix on said print label said tag bases supplied serially by said supplying device, said fixing device disposed downstream from said reading device along said feeding path inside said main body;
a communication device configured to write particular information into said RFID circuit element via radio communication, said communication device disposed downstream from said fixing device along said feeding path inside said main body, wherein the particular information corresponds to the optical detector read by said reading device; and
a carry-out exit configured to carry the RFID label out to an outside of said main body, said RFID label produced by means of fixing one of said tag bases to each of said print labels by said fixing device and writing the particular information into said IC circuit part by said communication device, said carry-out exit formed through said main body.

2. A label printing and communication system comprising:
a print apparatus configured to produce a print label with a text print formed; and
a communication apparatus configured to fix on said print label an RFID circuit element having an IC circuit part that stores information and an antenna that transmits and receives information and configured to produce an RFID label by means of writing tag information to said RFID circuit element fixed;
said print apparatus comprising:
a cartridge holder that a cartridge is able to be mounted and dismounted, the cartridge including a base tape roll that winds a base tape and including a cover film roll that winds a cover film that barcode information corresponding to said tag information is formed in advance;
a roller drive shaft configured to provide a driving force for feeding out said cover film from said cover film roll and feeding out said base tape from said base tape roll and further to provide a pressure force for bonding said cover film to said base tape in the case that said cartridge is mounted to said cartridge holder;
a thermal head configured to form a text information corresponding to the tag information onto said cover film fed by means of the driving force of said roller drive shaft before said cover film is bonded said base tape by means of the pressure force of said roller rive shaft;
a cutter configured to cut a print label tape formed after a printing of the text information by said thermal head to said cover film and also a bonding of said cover film to said base tape by means of said roller drive shaft are completed, into a predetermined length, and configured to produce said print label where the text information and the barcode information are formed by printing; and
a carry-out roller configured to carry out said print label produced by means of said cutter from a housing that houses said cartridge holder, said roller driving shaft, said thermal head, and said cutter therein;
said communication apparatus comprising:
an insert determination portion configured to determine whether said print label is inserted or not;
a feeding device configured to feed said print label inserted;
a start control portion configured to control said feeding device, so that a feeding of the inserted print label is started when said insert determination portion determined that said print label is inserted;
a barcode sensor configured to optically read the barcode information included to said print label fed;
a stop control portion configured to control said feeding device, so that the feeding of said print label is stopped when the print label reaches a predetermined feeding position for fixing said RFID circuit element;
a tag fix device configured to fix said RFID circuit element to said print label that came to rest in a feeding path by means of the control of said stop control portion;
a tag information acquisition portion configured to decode said barcode information read by said barcode sensor and acquire the tag information corresponding to the barcode information read;
a communication antenna configured to communicate with said RFID circuit element via radio communication;
a tag information write portion configured to write the tag information acquired by said acquisition portion to said RFID circuit element by means of radio communication using said communication antenna, and also configured to produce an RFID label, where the text information and the barcode information are formed by printing as well as the tag information is written; and
a carry-out roller configured to carry out said RFID label produced by means of said tag information write portion from a housing that houses said feeding device, said barcode sensor, said tag fix device, arid said communication antenna therein.

3. A label printing and communication system comprising:
a print apparatus configured to produce a print label with a text print formed; and
a communication apparatus configured to fix on said print label an RFID circuit element having an IC circuit part that stores information and an antenna that transmits and receives information and configured to produce an RFID label by means of writing tag information to said RFID circuit element fixed;
said print apparatus comprising:
a cartridge holder that a cartridge is able to be mounted and dismounted, the cartridge including a base tape roll that winds a base tape and including a cover film roll that winds a cover film that one piece of barcode information corresponding to a plural pieces of said tag information is formed in advance;
a roller drive shaft configured to provide a driving force for feeding out said cover film from said cover film roll and feeding out said base tape from said base tape roll and further to provide a pressure force for bonding said cover film to said base tape in the case that said cartridge is mounted to said cartridge holder;
a thermal head configured to form a text information corresponding to the tag information onto said cover film fed by means of the driving force of said roller drive shaft before said cover film is bonded said base tape by means of the pressure force of said roller rive shaft;
a cutter configured to cut a print label tape formed after a printing of the text information by said thermal head to said cover film and also a bonding of said cover film to said base tape by means of said roller drive shaft are completed, into a predetermined length, and configured to produce said print label where the text information and the barcode information are formed by printing; and
a carry-out roller configured to carry out said print label produced by means of said cutter from a housing that houses said cartridge holder, said roller driving shaft, said thermal head, and said cutter therein;
said communication apparatus comprising:
an insert determination portion configured to determine whether said print label is inserted or not;
a feeding device configured to feed said print label inserted;
a start control portion configured to control said feeding device, so that a feeding of the inserted print label is started when said insert determination portion determined that said print label is inserted;
a barcode sensor configured to optically read the barcode information included to said print label fed;
a stop control portion configured to control said feeding device, so that the feeding of said print label is stopped when the print label reaches a predetermined feeding position for fixing said RFID circuit element;
a tag fix device configured to fix said RFID circuit element to said print label that came to rest in a feeding path by means of the control of said stop control portion;
a tag information acquisition portion configured to decode said one piece of barcode information read by said barcode sensor and acquire said plural pieces of tag information corresponding to the barcode information read;
a display device configured to display said plural pieces of tag information acquired by said tag information acquisition portion in a manner capable of selecting;
an operation device used to select one piece of tag information from said plural pieces of tag information displayed in said display device;
a communication antenna configured to communicate with said RFID circuit element via radio communication;
a tag information write portion configured to write the one piece of tag information selected by said operation device to said RFID circuit element by means of radio communication using said communication antenna, and also configured to produce an RFID label, where the text information and the barcode information are formed by printing as well as the tag information is written; and
a carry-out roller configured to carry out said RFID label produced by means of said tag information write portion from a housing that houses said feeding device, said barcode sensor, said tag fix device, and said communication antenna therein.

4. A label printing and communication system comprising:
a print apparatus configured to produce a print label with a text print formed; and
a communication apparatus configured to fix on said print label an RFID circuit element having an IC circuit part that stores information and an antenna that transmits and receives information and configured to produce an RFID label by means of writing tag information to said RFID circuit element fixed;

said print apparatus comprising:

a cartridge holder that a cartridge is able to be mounted and dismounted, the cartridge including a base tape roll that winds a base tape and including a cover film roll that winds a cover film;

a roller drive shaft configured to provide a driving force for feeding out said cover film from said cover film roll and feeding out said base tape from said base tape roll and further to provide a pressure force for bonding said cover film to said base tape in the case that said cartridge is mounted to said cartridge holder;

a thermal head configured to form a text information corresponding to the tag information onto said cover film fed by means of the driving force of said roller drive shaft before said cover film is bonded said base tape by means of the pressure force of said roller rive shaft;

a cutter configured to cut a print label tape formed after a printing of the text information by said thermal head to said cover film and also a bonding of said cover film to said base tape by means of said roller drive shaft are completed, into a predetermined length, and configured to produce said print label where the text information is formed by printing; and a carry-out roller configured to carry out said print label produced by means of said cutter from a housing that houses said cartridge holder, said roller driving shaft, said thermal head, and said cutter therein;

said communication apparatus comprising:

an insert determination portion configured to determine whether said print label is inserted or not;

a feeding device configured to feed said print label inserted;

a start control portion configured to control said feeding device, so that a feeding of the inserted print label is started when said insert determination portion determined that said print label is inserted;

a character recognize device configured to optically read and recognize said text information that is formed onto said print label fed;

a stop control portion configured to control said feeding device, so that the feeding of said print label is stopped when the print. label reaches a predetermined feeding position for fixing said RFID circuit element;

a tag fix device configured to fix said RFID circuit element to said print label that came to rest in a feeding path by means of the control of said stop control portion;

a tag information acquisition portion configured to acquire the tag information corresponding to the text information recognized by said character recognize device;

a communication antenna configured to communicate with said RFID circuit element via radio communication;

a tag information write portion configured to write the tag information acquired by said acquisition portion to said RFID circuit element by means of radio communication using said communication antenna, and also configured to produce an RFID label, where the text information is formed by printing as well as the tag information is written; and a carry-out roller configured to carry out said RFID label produced by means of said tag information write portion from a housing that houses said feeding device, said tag fix device, and said communication antenna therein.

* * * * *